United States Patent
Ekambaram et al.

(10) Patent No.: US 10,565,451 B2
(45) Date of Patent: *Feb. 18, 2020

(54) AUGMENTED VIDEO ANALYTICS FOR TESTING INTERNET OF THINGS (IOT) DEVICES

(71) Applicant: INTERNATIONAL BUSINESS MACHINES CORPORATION, Armonk, NY (US)

(72) Inventors: Vijay Ekambaram, Chennai (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/245,280

(22) Filed: Jan. 11, 2019

(65) Prior Publication Data

US 2019/0147248 A1 May 16, 2019

Related U.S. Application Data

(63) Continuation of application No. 15/183,377, filed on Jun. 15, 2016, now Pat. No. 10,248,863.

(51) Int. Cl.
*G06F 3/00* (2006.01)
*G06K 9/00* (2006.01)
(Continued)

(52) U.S. Cl.
CPC ......... *G06K 9/00671* (2013.01); *G06F 1/163* (2013.01); *G06F 3/011* (2013.01);
(Continued)

(58) Field of Classification Search
CPC ........................................................ G06F 9/54
(Continued)

(56) References Cited

U.S. PATENT DOCUMENTS 8,594,482 B2   11/2013   Fan
8,803,970 B2   8/2014    Weisensale
(Continued)

FOREIGN PATENT DOCUMENTS

CA   2158912 A1   7/1996
CN   202873069 U  4/2013
CN   103499965 A  1/2014

OTHER PUBLICATIONS

Albert N. Badre, A user interface evaluation environment using synchronized video, visualizations and event trace data. (Year: 1995).*

(Continued)

*Primary Examiner* — Lechi Truong
(74) *Attorney, Agent, or Firm* — Schmeiser, Olsen & Watts; Mark C. Vallone

(57) ABSTRACT

An approach is provided for testing an Internet of Things device. First data including indications of human interactions with the device, captured on video, and indicating visual device output and second data indicating non-visual device output are received during testing of the device. An event log of the device is received. The first and second data, the event log entries, and indications of the human interactions are overlaid onto frames of the video that include the device, so that timings of the frames are correlated with timestamps of the overlaid items. Based on the overlaid items, performance, functionality, and usability issues are detected and markers of the issues are generated and overlaid onto a timeline of the video. Responsive to a user selection of one of the markers, the computer locating and displaying a frame of the video that depicts the issue that corresponds to the selected marker.

19 Claims, 17 Drawing Sheets

(51) Int. Cl.
  *H04N 7/18* (2006.01)
  *G06F 1/16* (2006.01)
  *G06F 11/26* (2006.01)
  *H04N 7/01* (2006.01)
  *G06F 9/54* (2006.01)
  *G06F 3/01* (2006.01)

(52) U.S. Cl.
  CPC ............... *G06F 9/54* (2013.01); *G06F 11/26* (2013.01); *G06K 9/00335* (2013.01); *G06K 9/00771* (2013.01); *H04N 7/014* (2013.01); *H04N 7/18* (2013.01); *H04N 7/183* (2013.01); *G06K 9/00302* (2013.01)

(58) Field of Classification Search
  USPC ......................................................... 719/310
  See application file for complete search history.

(56) References Cited

U.S. PATENT DOCUMENTS

| | | |
|---|---|---|
| 2008/0177994 A1 | 7/2008 | Mayer |
| 2010/0030578 A1* | 2/2010 | Siddique ............ G06Q 10/0637 705/3 |
| 2015/0036881 A1 | 2/2015 | Sharma |
| 2016/0307374 A1 | 10/2016 | Kurz |
| 2017/0053159 A1 | 2/2017 | Oh |
| 2017/0171607 A1 | 6/2017 | Britt |
| 2017/0364747 A1* | 12/2017 | Ekambaram ....... G06K 9/00671 |
| 2018/0329617 A1* | 11/2018 | Jones .................. G06F 3/04847 |

OTHER PUBLICATIONS

Kato, Hirokasu et al.; Marker Tracking and HMD Calibration for a Video-based Augmented Reality Conferencing System; Proceedings of 2nd IEEE and CM International Workshop on Augmented Reality; Oct. 20-21, 1999; 10 pages.

MacLeod, Miles et al. The Development of DRUM: a Software Tool for Video-Assisted Usability Evaluation; In Proceedings of HCI '93; 1993; pp. 293-309.

Rohrman, Justin; Testing the Internet of Things; Feb. 25, 2015; retrieved from the Internet Dec. 28, 2015; URL: http://blog,smartbear.com/user-excperience/testing-internt-of-things/; 5 pages.

Syta, James M.; List of IBM Patents or Patent Applications Treated as Related; Jan. 11, 2019; 1 page.

* cited by examiner

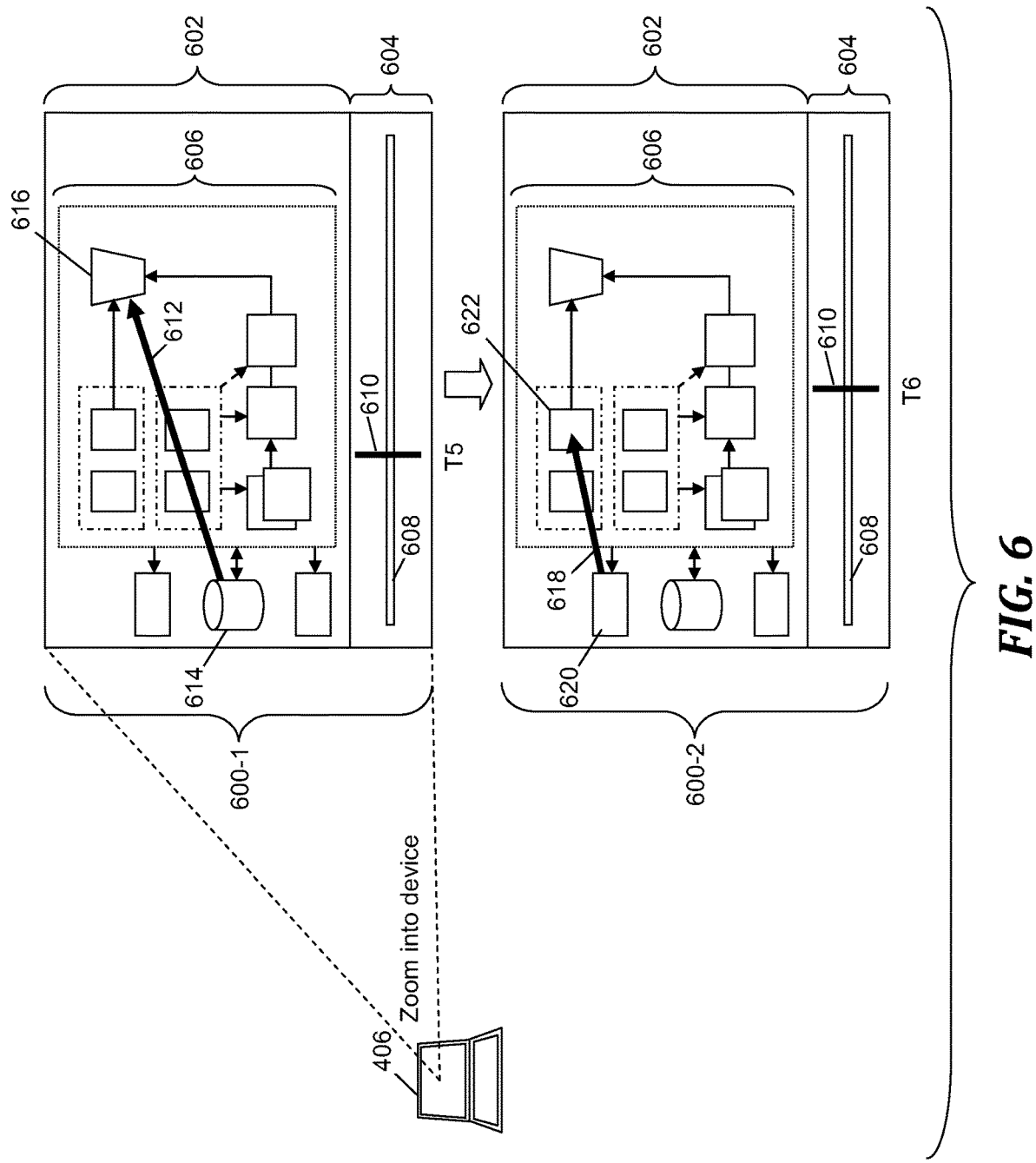

AUGMENTED VIDEO ANALYTICS FOR TESTING INTERNET OF THINGS (IOT) DEVICES

CROSS REFERENCE TO RELATED APPLICATIONS

This application is a continuation application claiming priority to Ser. No. 15/183,377 filed Jun. 15, 2016, now U.S. Pat. No. 10,248,863 issued Apr. 2, 2019, the contents of which are hereby incorporated by reference.

BACKGROUND

The present invention relates to testing networked devices, and more particularly to testing Internet of Things (IoT) devices and detecting, reporting, and resolving issues identified by the testing.

Testing IoT devices is very challenging because it includes testing multiple, heterogeneous applications distributed across multiple, heterogeneous devices which work cooperatively for a common goal, rather than testing only a single application in a single device. Other challenges involved in IoT testing include a lack of a common protocol followed by the IoT devices and applications. Furthermore, interactions among the IoT devices and applications is complex, which causes difficulties in identifying bottlenecks.

Most IoT testing happens in real-time and runs for a very long time, as such testing facilitates day-to-day human use cases. For example, real-time field trials are typically used in order to test a smart home. An end user (i.e., tester) behaves as a normal user and interacts with IoT devices in the smart home. This real-time testing enables the IoT devices to be tested in actual contexts, which is mandatory for IoT device testing. The tester interacts with IoT devices in the smart home for several days so that several outlier and/or corner cases occur in real-time. Based on a captured manual report regarding the outlier and/or corner cases, suitable recovery or debugging procedures are followed.

SUMMARY

In a first embodiment, the present invention provides a method of testing a device in an Internet of Things. The method includes a computer receiving first data items indicating visually perceptible physical output of the device during a testing of the device. The first data items are captured on a video by a video camera surveilling the device during the testing of the device. The video camera is coupled to the computer. The method further includes the computer receiving second data items indicating non-visually perceptible physical output of the device during the testing. The method further includes the computer receiving an event log from a beacon continuously streamed by the device. The event log is generated by an instrumented application executed in the device. The method further includes the computer receiving indications of interactions of one or more humans with the device that occur during the testing. The interactions are captured by (1) a wearable device operated by a human during the testing or (2) a sensor that is coupled to the device and that senses the interactions. The method further includes based on the first data items indicating visually perceptible physical output, the second data items indicating non-visually perceptible physical output, the event log, and the indications of the interactions, the computer overlaying the first data items, the second data items, entries included in the event log, and the indications of the interactions onto respective frames of the video that include the device, so that timings of the frames are correlated with timestamps of (1) the first data items, (2) the second data items, (3) the entries from the event log, and (4) the indications of the interactions. The method further includes based on the video having the overlaid first data items, second data items, entries included in the event log, and the indications of the interactions, the computer detecting performance, functionality, and usability issues and generating respective markers of the issues. The method further includes the computer indexing the video with the markers by overlaying the markers on a timeline of the video. The method further includes in response to a selection of one of the markers by a user which indicates an issue included in the issues, the computer locating and displaying a frame of the video that depicts the issue.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of testing a device in an Internet of Things. The method includes the computer system receiving first data items indicating visually perceptible physical output of the device during a testing of the device. The first data items are captured on a video by a video camera surveilling the device during the testing of the device. The video camera is coupled to the computer system. The method further includes the computer system receiving second data items indicating non-visually perceptible physical output of the device during the testing. The method further includes the computer system receiving an event log from a beacon continuously streamed by the device. The event log is generated by an instrumented application executed in the device. The method further includes the computer system receiving indications of interactions of one or more humans with the device that occur during the testing. The interactions are captured by (1) a wearable device operated by a human during the testing or (2) a sensor that is coupled to the device and that senses the interactions. The method further includes based on the first data items indicating visually perceptible physical output, the second data items indicating non-visually perceptible physical output, the event log, and the indications of the interactions, the computer system overlaying the first data items, the second data items, entries included in the event log, and the indications of the interactions onto respective frames of the video that include the device, so that timings of the frames are correlated with timestamps of (1) the first data items, (2) the second data items, (3) the entries from the event log, and (4) the indications of the interactions. The method further includes based on the video having the overlaid first data items, second data items, entries included in the event log, and the indications of the interactions, the computer system detecting performance, functionality, and usability issues and generating respective markers of the issues. The method further includes the computer system indexing the video with the markers by overlaying the markers on a timeline of the video. The method further includes in response to a selection of one of the markers by a user which indicates an issue included in the issues, the computer system locating and displaying a frame of the video that depicts the issue.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of testing a device in an Internet of Things. The method includes the computer system receiving first data items indicating visually perceptible physical output of the device during a testing of the device. The first data items are captured on a video by a video camera surveilling the device during the testing of the device. The video camera is coupled to the computer system. The method further includes the computer system receiving second data items indicating non-visually perceptible physical output of the device during the testing. The method further includes the computer system receiving an event log from a beacon continuously streamed by the device. The event log is generated by an instrumented application executed in the device. The method further includes the computer system receiving indications of interactions of one or more humans with the device that occur during the testing. The interactions are captured by (1) a wearable device operated by a human during the testing or (2) a sensor that is coupled to the device and that senses the interactions. The method further includes based on the first data items indicating visually perceptible physical output, the second data items indicating non-visually perceptible physical output, the event log, and the indications of the interactions, the computer system overlaying the first data items, the second data items, entries included in the event log, and the indications of the interactions onto respective frames of the video that include the device, so that timings of the frames are correlated with timestamps of (1) the first data items, (2) the second data items, (3) the entries from the event log, and (4) the indications of the interactions. The method further includes based on the video having the overlaid first data items, second data items, entries included in the event log, and the indications of the interactions, the computer system detecting performance, functionality, and usability issues and generating respective markers of the issues. The method further includes the computer system indexing the video with the markers by overlaying the markers on a timeline of the video. The method further includes in response to a selection of one of the markers by a user which indicates an issue included in the issues, the computer system locating and displaying a frame of the video that depicts the issue.

Embodiments of the present invention provide automated monitoring of IoT device testing to detect and report functional, performance, and usability issues and an indexing mechanism that facilitates an efficient and automated determination of root causes of the detected issues.

BRIEF DESCRIPTION OF THE DRAWINGS

FIG. 6 is an example of displaying log details that overlay components that are internal to an IoT device in the system of FIG. 1, in accordance with embodiments of the present invention.

DETAILED DESCRIPTION

Overview

Embodiments of the present invention provide an automatic construction of an augmented test video of devices in an IoT environment by using a video surveillance camera and sensors to capture events of each device and interactions between human testers and the devices. The test video may be augmented by automatically correlating temporal and spatial aspects of a physical test world and a virtual test world. The physical test world includes physical output changes of the devices and human interactions with the devices. The virtual test world includes event logs of the devices. The augmented test video may be subsequently analyzed to automatically detect functional, performance and usability issues related to the devices. Embodiments of the present invention provide an indexing scheme which allows an easy traversal in the video to an occurrence of any of the detected issues based on a criticality assigned to the issue. The augmented test video also enables a feature to backtrack in the video to trace respective root causes of the detected issues.

As used herein, the IoT is defined as a network of physical devices and objects (e.g., vehicles and buildings) which may be embedded with electronics, software, sensors, and network connectivity, which enables the devices and objects to collect and exchange data. The IoT allows devices and objects to be sensed and controlled remotely across existing network infrastructure. IoT devices may be used to monitor and control the mechanical, electrical, and electronic systems used in various types of commercial and residential buildings. For example, IoT devices may be used to monitor and control the lighting, heating, ventilation, air conditioning, home appliances, communication systems, entertainment, and home security devices in a home to improve convenience, comfort, energy efficiency, and security.

System For Testing IoT Devices by Using Augmented Video Analytics

Figure 1:
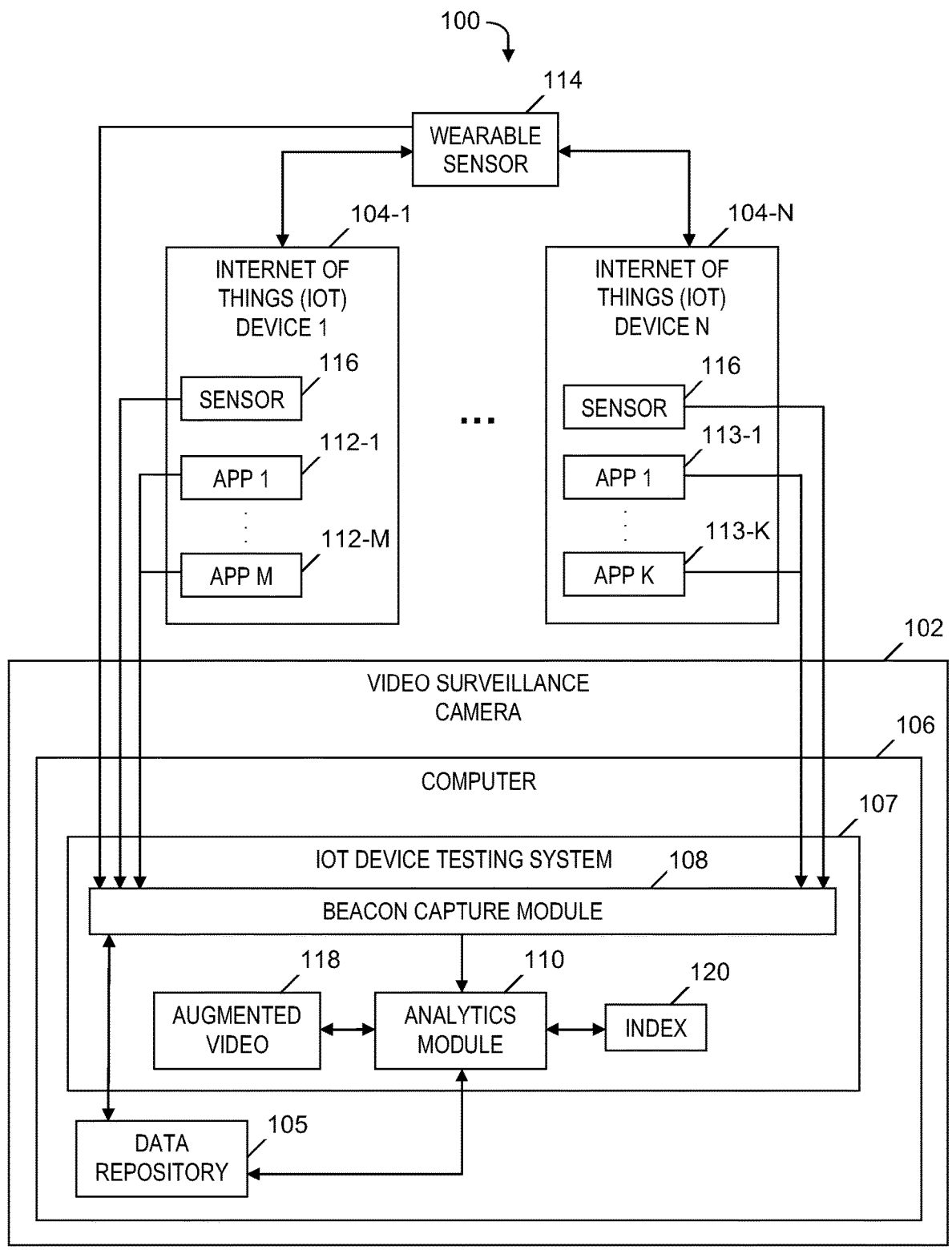
FIG. 1 is a block diagram of a system for testing IoT devices by using augmented video analytics, in accordance with embodiments of the present invention.

FIG. 1 is a block diagram of a system 100 for testing IoT devices by using augmented video analytics, in accordance with embodiments of the present invention. System 100 includes a video surveillance camera 102 and IoT device 104-1, ..., IoT device 104-N (i.e., IoT devices 1, ..., N), where N is an integer greater than one. IoT devices 104-1, ..., 104-N are heterogeneous devices which do not have common protocol for testing. Video surveillance camera 102 records the IoT devices 1, ..., N on a test video during testing of IoT devices 1, ..., N. The recording by video surveillance camera 102 may include images that record visible physical output or other visibly perceptible events of the IoT devices 1, ..., N or interactions between one or more human testers and at least one of the IoT devices 1, ..., N. Video surveillance camera 102 stores the test video and recorded visible physical output and other visibly perceptible events in data repository 105.

Video surveillance camera 102 includes a computer 106, which executes a software-based IoT device testing system 107, which includes a beacon capture module 108 and an analytics module 110. Beacon capture module 108 receives beacons that include event logs generated and transmitted from applications (i.e., apps) being executed in IoT devices 1, ..., N. Each of the IoT devices 1, ..., N may be executing one or more apps, which are instrumented so that they generate and continuously stream the beacons that include the event logs. Beacon capture module 108 collects the event logs received in the beacons and stores the event logs in data repository 105.

Any two devices included in IoT devices 1, ..., N may be executing identical apps, different apps, or a combination of identical apps and different apps. IoT device 104-1 executes app 112-1, ..., app 112-M, where M is an integer greater than or equal to one. IoT device 104-N executes app 113-1, ..., 113-K, where K is an integer greater than or equal to one, and M and K may be equal or unequal.

System 100 includes a wearable sensor 114 worn by a human tester (not shown). Wearable sensor 114 captures and logs data about interactions between the human tester and IoT devices 1, ..., N. Wearable sensor 114 continuously streams the logged data about the interactions as a beacon. Beacon capture module 108 receives the beacon from wearable sensor 114, collects the logged data from the beacon, and stores the logged data in data repository 105. In an alternate embodiment, a modified system 100 includes a plurality of wearable sensors (not shown) worn by respective human testers, where the wearable sensors capture and log data about interactions between the human testers and IoT devices 1, ..., N. In another alternate embodiment, a modified system 100 includes no wearable sensors.

Each of IoT devices 1, ..., N includes an embedded sensor 116, which capture and log non-visual data (i.e., data about the conditions surrounding the device or output of the device that is not visually perceptible). Sensor 116 continuously streams the logged non-visual data in beacons. Beacon capture module 108 receives the beacon from sensor 116, collects the logged data from the beacon, and stores the logged data in data repository 105. In an alternate embodiment, a modified system 100 includes one or more, but not all, of the IoT devices 1, ..., N which include sensor 116. In another alternate embodiment, none of the IoT devices 1, ..., N in a modified system 100 include an embedded sensor.

Analytics module 110 uses the following log entries which were captured by beacon capture module 108 to generate an augmented video 118 (i.e., a reality based component level event capture video): events and human interactions with IoT devices 1, ..., N captured by video surveillance camera 102, event logs included in beacons streamed by apps 1, ..., M, logged data about human interactions with IoT devices 1, ..., N captured and streamed by wearable sensor 114, and logged non-visual data captured and streamed by sensor 116. Augmented video 118 correlates the timestamps of the log entries with the timing of the test video.

Using augmented video 118, analytics module 110 detects performance, functionality, and/or usability issues with IoT devices 1, ..., N, generates an index 120 of augmented video 118, and uses index 120 to identify root causes (not shown) of the issues.

Figure 2:
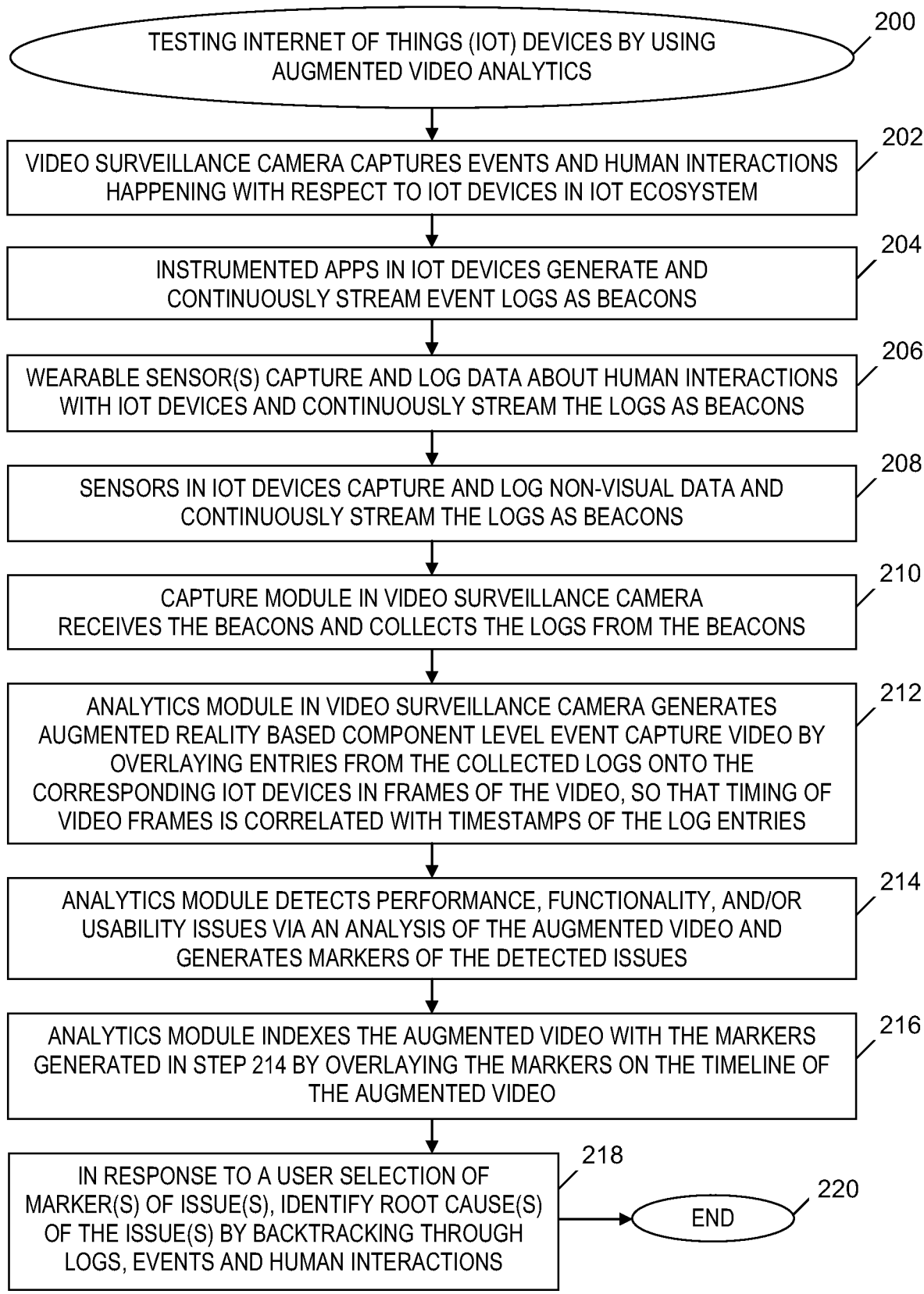
FIG. 2 is a flowchart of a process of testing IoT devices by using augmented video analytics, where the process is implemented in the system of FIG. 1, in accordance with embodiments of the present invention.
Figure 3:
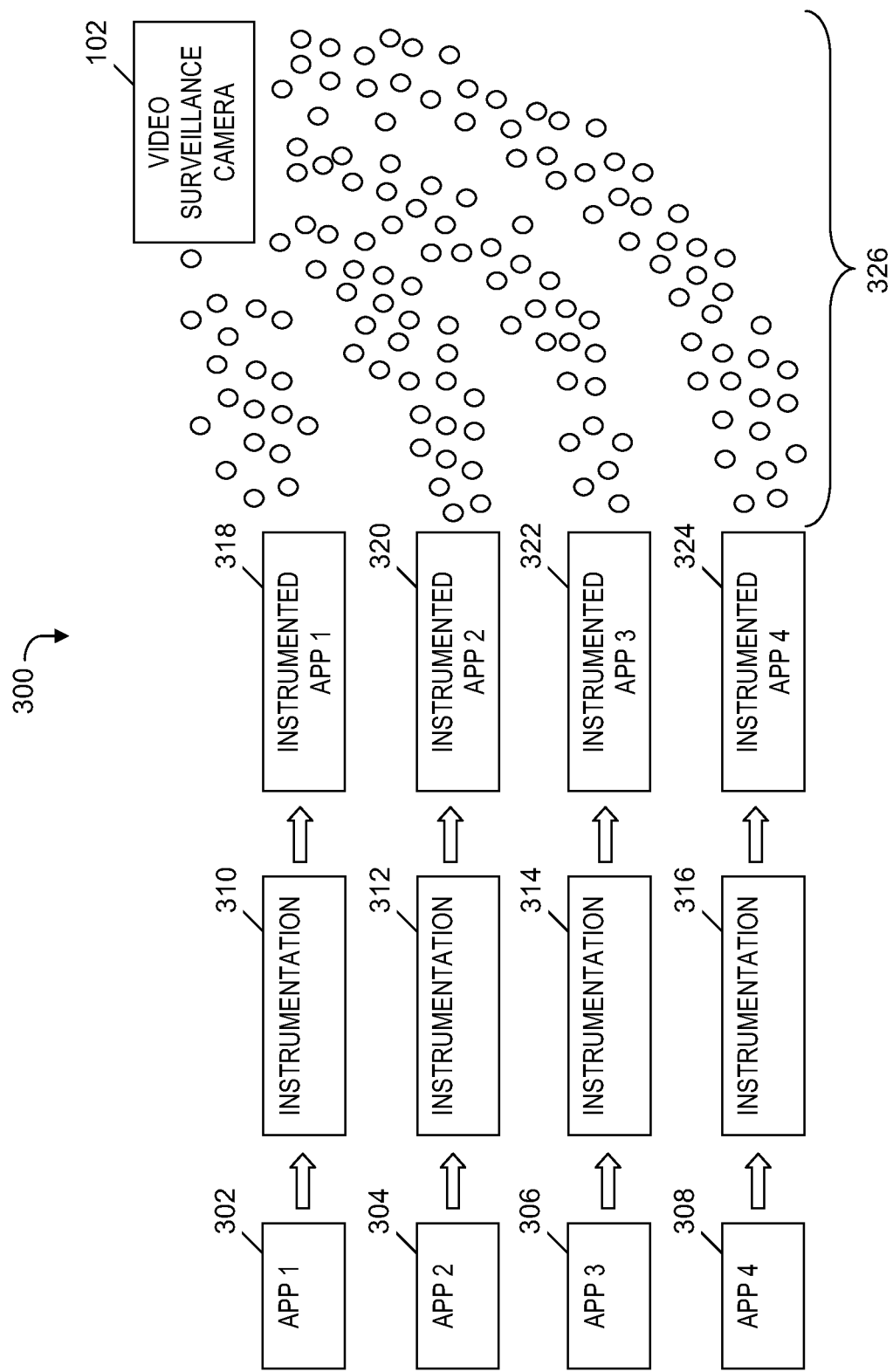
FIG. 3 is an example of an instrumentation of apps participating in the system of FIG. 1, in accordance with embodiments of the present invention.

The functionality of the components shown in FIG. 1 is described in more detail in the discussion of FIG. 2 and FIG. 3 presented below.

Process for Testing IoT Devices by Using Augmented Video Analytics

FIG. 2 is a flowchart of a process of testing IoT devices by using augmented video analytics, where the process is implemented in the system of FIG. 1, in accordance with embodiments of the present invention. The process of FIG. 2 begins at step 200. In step 202, video surveillance camera 102 captures events happening with respect to IoT devices 104-1, ..., 104-N (see FIG. 1) and interactions (i.e., human interactions) between human tester(s) and IoT devices 104-1, ..., 104-N (see FIG. 1).

In step 204, the instrumented apps in IoT devices 104-1, ..., 104-N (see FIG. 1), including app 112-1, ..., app 112-M (see FIG. 1) installed in IoT device 104-1 (see FIG. 1) and app 113-1, ..., app 113-K (see FIG. 1) installed in IoT device 104-N (see FIG. 1), generate and continuously stream event logs as beacons. Prior to step 204, apps installed in IoT devices 104-1, ..., 104-N (see FIG. 1) were instrumented with an IoT logging beacon analytics library, which continuously streams logs as beacons.

In step 206, wearable sensor 114 (see FIG. 1) worn by a human tester captures and logs data about interaction(s) between the human tester and IoT devices 104-1, ..., 104-N (see FIG. 1) and continuously streams the logged data as beacons.

In step 208, sensor 116 (see FIG. 1) captures and logs non-visual data (e.g., heating or vibration of an IoT device) that specifies visually imperceptible conditions experienced by IoT devices 104-1, ..., 104-N (see FIG. 1) and/or visually imperceptible output produced by IoT devices 104-1, ..., 104-N (see FIG. 1) or by components internal to the aforementioned IoT devices. Also in step 208, sensor 116 (see FIG. 1) continuously streams the logged data as beacons.

In step 210, beacon capture module 108 (see FIG. 1) captures the beacons streamed in steps 204, 206 and 208, receives the events and human interactions captured by the video surveillance camera 102 in step 202, and saves the information in the captured beacons and received events and human interactions in data repository 105 (see FIG. 1). Also in step 210, beacon capture module 108 (see FIG. 1) collects the logs included in the captured beacons.

After step 210 and prior to step 212, analytics module 110 (see FIG. 1) receives entries and timestamps of the entries from the logs collected by beacon capture module 108 (see FIG. 1) in step 210 and receives the events and human interactions captured in step 202 and timestamps of the events and human interactions captured in step 202. Alternatively, analytics module 110 (see FIG. 1) retrieves from data repository 105 (see FIG. 1) the entries and timestamps of the entries from the aforementioned logs and the events and human interactions and the associated timestamps of the events and human interactions captured in step 202.

In step 212, analytics module 110 (see FIG. 1) generates augmented video 118 (see FIG. 1) by overlaying the entries from the logs and the events and human interactions captured in step 202 onto corresponding IoT devices depicted in frames of the test video (i.e., IoT devices included in IoT devices 104-1, . . . , 104-N in FIG. 1), so that a timeline of the augmented video is correlated with the received timestamps of the aforementioned entries of the logs, events, and human interactions. A log entry regarding a message sent from a first IoT device to a second IoT device (or from a first IoT device to itself) includes a source and destination object identifier (ID), together with message details. User(s) manually matches a unique ID in a log entry with an IoT device or object in the video stream, which enables analytics module 110 (see FIG. 1) to overlay log details in proximity to or on top of various IoT devices in augmented video 118 (see FIG. 1) and to overlay messages sent from one IoT device to another IoT device.

In step 214, analytics module 110 (see FIG. 1) detects performance, functionality, and/or usability issues relative to IoT devices 104-1, . . . , 104-N (see FIG. 1) via an analysis of augmented video 118 (see FIG. 1). Also in step 214, analytics module 110 (see FIG. 1) generates respective markers of the detected performance, functionality, and usability issues.

In step 216, analytics module 110 (see FIG. 1) generates index 120 (see FIG. 1) by indexing augmented video 118 (see FIG. 1) with the markers generated in step 214, which includes overlaying the markers on a displayed timeline of augmented video 118 (see FIG. 1).

In step 218, in response to a user selection of one of the markers overlaid on the displayed timeline, analytics module 110 (see FIG. 1) automatically identifies a root cause of the performance, functional, or usability issue that corresponds to the selected marker, where identifying the root cause includes backtracking through the logged data, events, and human interactions included in augmented video 118 (see FIG. 1).

After step 218, the process of FIG. 2 ends at step 220.

FIG. 3 is an example 300 of an instrumentation of apps participating in the system of FIG. 1, in accordance with embodiments of the present invention. Example 300 includes apps 302, 304, 306, and 308, which are included in IoT devices that are participating in the testing procedure of FIG. 2, and which are examples of apps in IoT devices 104-1, . . . , 104-N (see FIG. 1). Instrumentations 310, 312, 314, and 316 are applied to apps 302, 304, 306, and 308, respectively, which result in instrumented apps 318, 320, 322, and 324, respectively. Instrumentation 310 includes instrumenting app 302 using an IoT logging beacon analytics library (not shown in FIG. 1), which results in instrumented app 318. In one embodiment, the IoT logging beacon analytics library adds logging calls to the instrumented apps to report in logs all evens happening within each of IoT devices 104-1, . . . , 104-N (see FIG. 1) and across the IoT devices 104-1, . . . , 104-N (see FIG. 1). The IoT logging beacon analytics library collects log entries that are generated or received by instrumented app 318, batches the collected log entries periodically, and broadcasts in a continuous stream the batched log entries as beacons, which are included in beacons 326. The beacons broadcast by the IoT logging beacon analytics library are received by beacon capture module 108 (see FIG. 1) in video surveillance camera 102.

Similarly, instrumented apps 320, 322, and 324 are instrumented with the IoT logging beacon analytics library, which collects log entries from instrumented apps 320, 322, and 324, batches the log entries periodically, and continuously streams the batched log entries as beacons, which are included in beacons 326, and which are received by beacon capture module 108 (see FIG. 1) in video surveillance camera 102.

IoT logging beacon analytics library provides logging formats which add details to log entries, such as identifiers of source and destination components, criticality, type of logs, etc. Beacon capture module 108 (see FIG. 1) in video surveillance camera 102 captures beacons 326 and saves them in data repository 105 (see FIG. 1). Using the IoT logging beacon analytics library and the capture of beacons 326, video surveillance camera 102 captures a complete test-execution environment and receives all log data about participating apps (e.g., apps 302, 304, 306, and 308) in system 100 (see FIG. 1).

Wearable sensors such as wearable sensor 114 (see FIG. 1) worn on one or more human testers' bodies capture more detailed human interactions (e.g., applying force or a hand gesture) with devices 104-1, . . . , 104-N (see FIG. 1). Sensors 116 (see FIG. 1) installed in devices 104-1, . . . , 104-N (see FIG. 1) capture non-visual data (e.g., vibration of the device or amount of heating being applied to the device), which is also continuously streamed as beacons that are received by beacon capture module 108 (see FIG. 1) in video surveillance camera 102.

Figure 4:
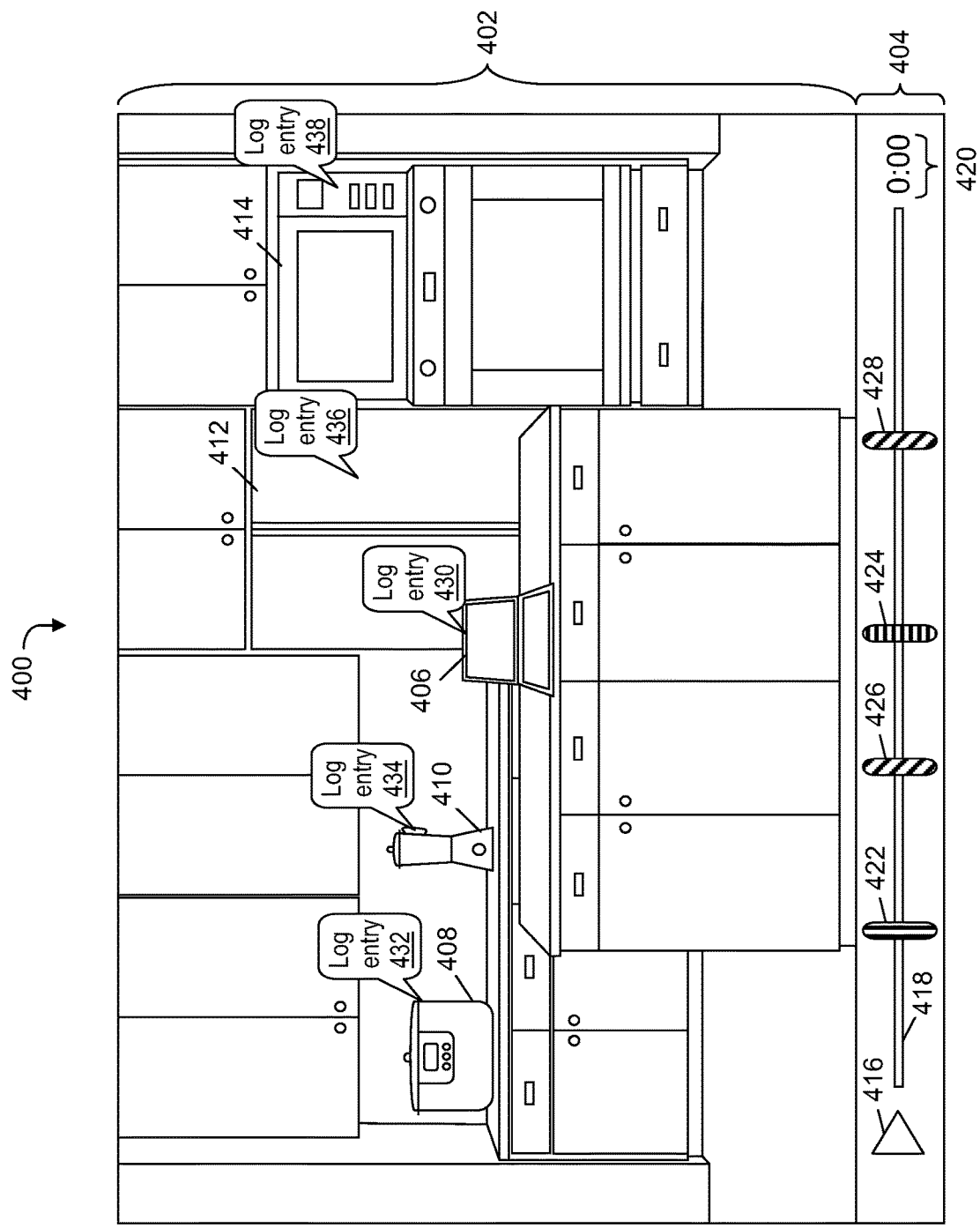
FIG. 4 is a sample augmented video 400 that illustrates tagging a video timeline in the system of FIG. 1, in accordance with embodiments of the present invention.

FIG. 4 is a sample augmented video 400 that illustrates tagging a video timeline in the system of FIG. 1, in accordance with embodiments of the present invention. Augmented video 400 is an example of augmented video 118 (see FIG. 1) and includes a display area 402 and a control area 404. Display area 402 includes a video frame of augmented video 118 (see FIG. 1), where the video frame displays IoT devices 406, 408, 410, 412, and 414 in an IoT testing environment which includes a kitchen of a home, and where the video frame is a result of the aforementioned IoT devices being tested by system 100 (see FIG. 1).

IoT device testing system 107 (see FIG. 1) generates control area 404 to include a video play button 416, a video timeline 418, a time indicator 420, and timeline markers 422, 424, 426, and 428, which have a visual representation that indicates criticality of an issue associated with one or more IoT devices (e.g., the timeline markers are color coded to indicate high, medium, and low levels of criticality of the issues). For example, timeline marker 422 is colored in a first color, which indicates that an issue of low criticality occurred at a time in the augmented video 400, where the time is indicated by the position of timeline marker 422 on timeline 418. Timeline marker 424 is colored in a second color, which indicates that an issue of medium criticality occurred at a time in the augmented video 400, where the time is indicated by the position of timeline marker 424 on timeline 418. Timeline markers 426 and 428 are colored in a third color, which indicates that respective issues of high criticality occurred at times in augmented video 400, where the times are indicated by the positions of markers 426 and 428 on timeline 418.

The augmented video 400 is also a result of a tester or developer choosing one of three issue filters: Performance, Functional, and Usability. IoT device testing system 107 (see FIG. 1) indexes augmented video 400 (see FIG. 1) so that the timeline markers that appear in control area 404 are markers that indicate issues that are associated with the chosen filter, and so that no other markers associated with the unchosen filters appear in control area 404. The developer or tester can select play button 416 to play video 400 through a period of time, or select one of the timeline markers to review log entries of the IoT devices at the time associated with the selected timeline marker. As the video 400 plays via the selection of play button 416 or in response to a selection of one of the timeline markers, the time indicator 420 shows a time associated with a video frame of video 400 that is currently displayed.

IoT device testing system 107 (see FIG. 1) augments the video frame by overlaying text that includes or is based on log entries 430, 432, 434, 436, and 438 onto the video frame in proximity to the displayed images of respective IoT devices 406, 408, 410, 412, and 414. For example, log entry 432 describes or specifies an event that resulted from an app running in device 408; therefore, the augmented video frame is generated so that the text of log entry 432 is displayed in display area 402 in proximity to device 408. The developer or tester uses video 400 to review IoT devices together their corresponding overlaid log entries.

FIGS. 5A-5D depict examples of log details overlaying IoT devices and messages sent between IoT devices in the system of FIG. 1, in accordance with embodiments of the present invention. FIG. 5A, FIG. 5B, FIG. 5C, and FIG. 5D depict sample augmented videos 500, 502, 504, and 506, respectively, each of which includes display area 402, control area 404, IoT devices 406, 408, 410, 412, and 414, video play button 416, video timeline 418, time indicator 420, and log entries 430, 432, 434, 436, and 438, which have functionalities as described above in the discussion of FIG. 4.

Every log entry generated in the IoT testing environment includes identifiers of a source object and a destination object (i.e., identifiers source and destination IoT devices), where the source object is the source of a message and the destination object is the destination of the message. Each of the aforementioned log entries also includes details of the message being sent from the source object to the destination object. The source and destination object may be the same object.

For a particular video stream frame, an end user may manually match the IoT devices 104-1, . . . , 104-N (see FIG. 1) to respective unique identifiers which are used in the aforementioned logs. IoT device testing system 107 (see FIG. 1) uses the correspondence between the identifiers used in the logs and the IoT devices 104-1, . . . , 104-N (see FIG. 1) to overlay the log details onto a video frame in proximity to the IoT devices that correspond to the log details. For example, IoT device testing system 107 (see FIG. 1) augments the video frame in display area 402 in FIGS. 5A-5D by overlaying log entries 430, 432, 434, 436, and 438 in proximity to respective IoT devices 406, 408, 410, 412, and 414. For example, log entry 432 describes or specifies an event that resulted from an app running in device 408; therefore, the augmented video frame is generated so that the text of log entry 432 is displayed in display area 402 next to, on top of, or partially on top of IoT device 408.

The augmented video frames included in the display area 402 in FIGS. 5A-5D include details of respective messages, together with an arrow that indicates which IoT device is the source object and which IoT device is the destination object. Alternatively, visual representations other than an arrow may be used to indicate the source and destination objects.

Figure 5A:
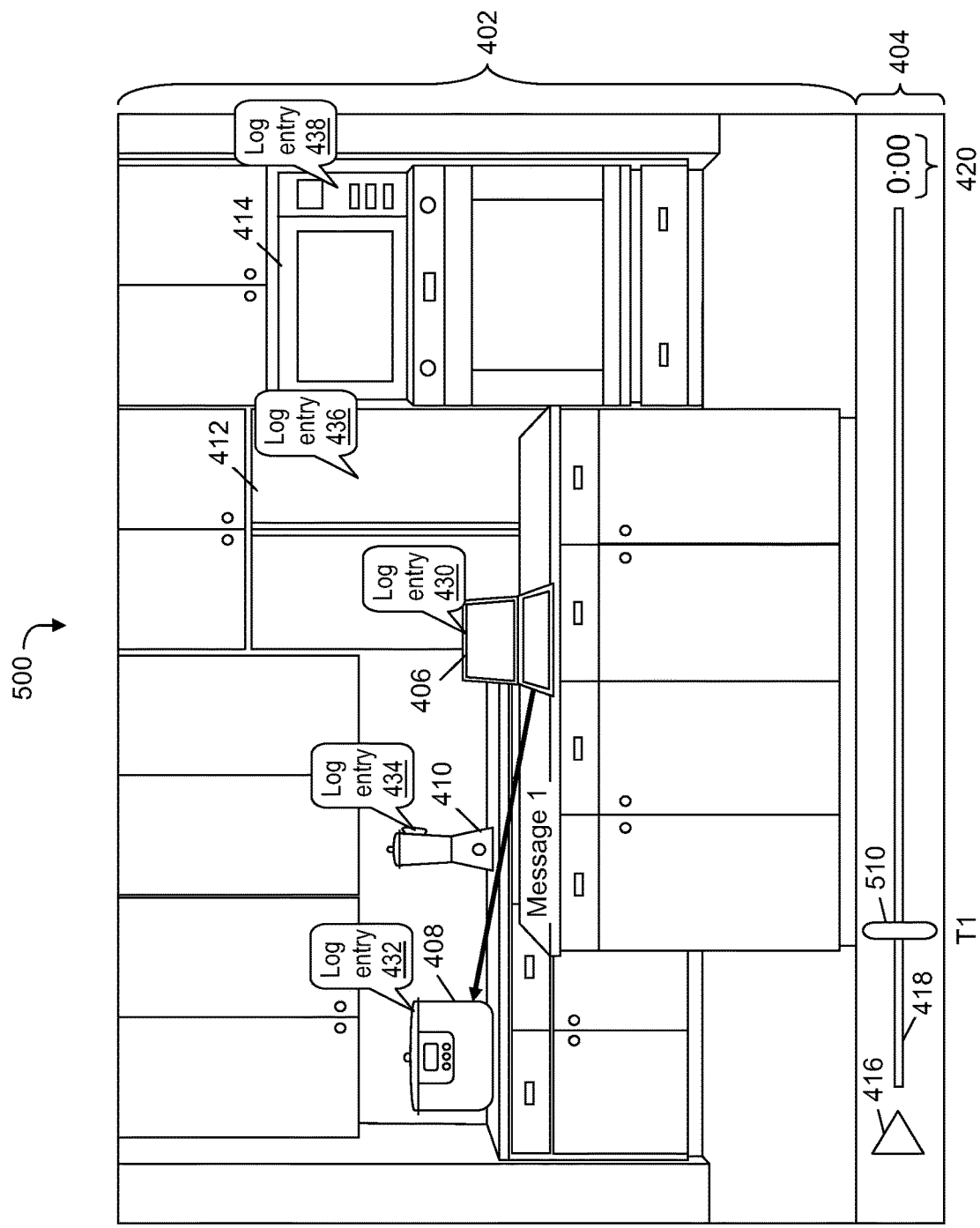
FIGS. 5A-5D depict examples of log details overlaying IoT devices and messages sent between IoT devices in the system of FIG. 1, in accordance with embodiments of the present invention.

IoT device testing system 107 (see FIG. 1) overlays details of a first message (i.e., labeled "Message 1" in FIG. 5A) sent from IoT object 406 to IoT object 408 onto the video frame included in display area 402 in FIG. 5A. The first message is sent at a time T1, as indicated by a first position of a timeline marker 510 on timeline 418.

Figure 5B:
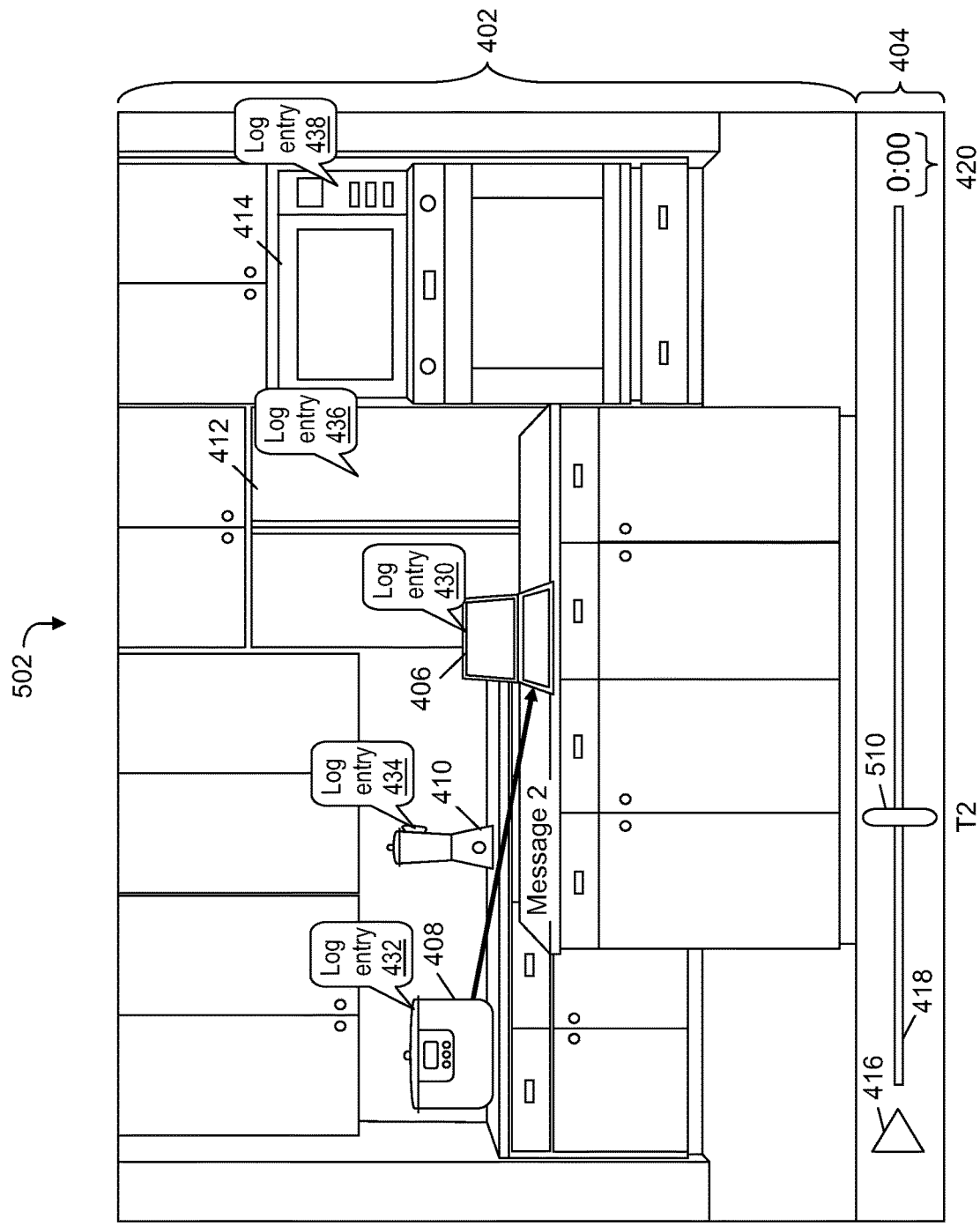

IoT device testing system 107 (see FIG. 1) overlays details of a second message (i.e., labeled "Message 2" in FIG. 5B) sent from IoT object 408 to IoT object 406 onto the video frame included in display area 402 in FIG. 5B. The second message is sent at a time T2, as indicated by a second position of timeline marker 510 on timeline 418.

Figure 5C:
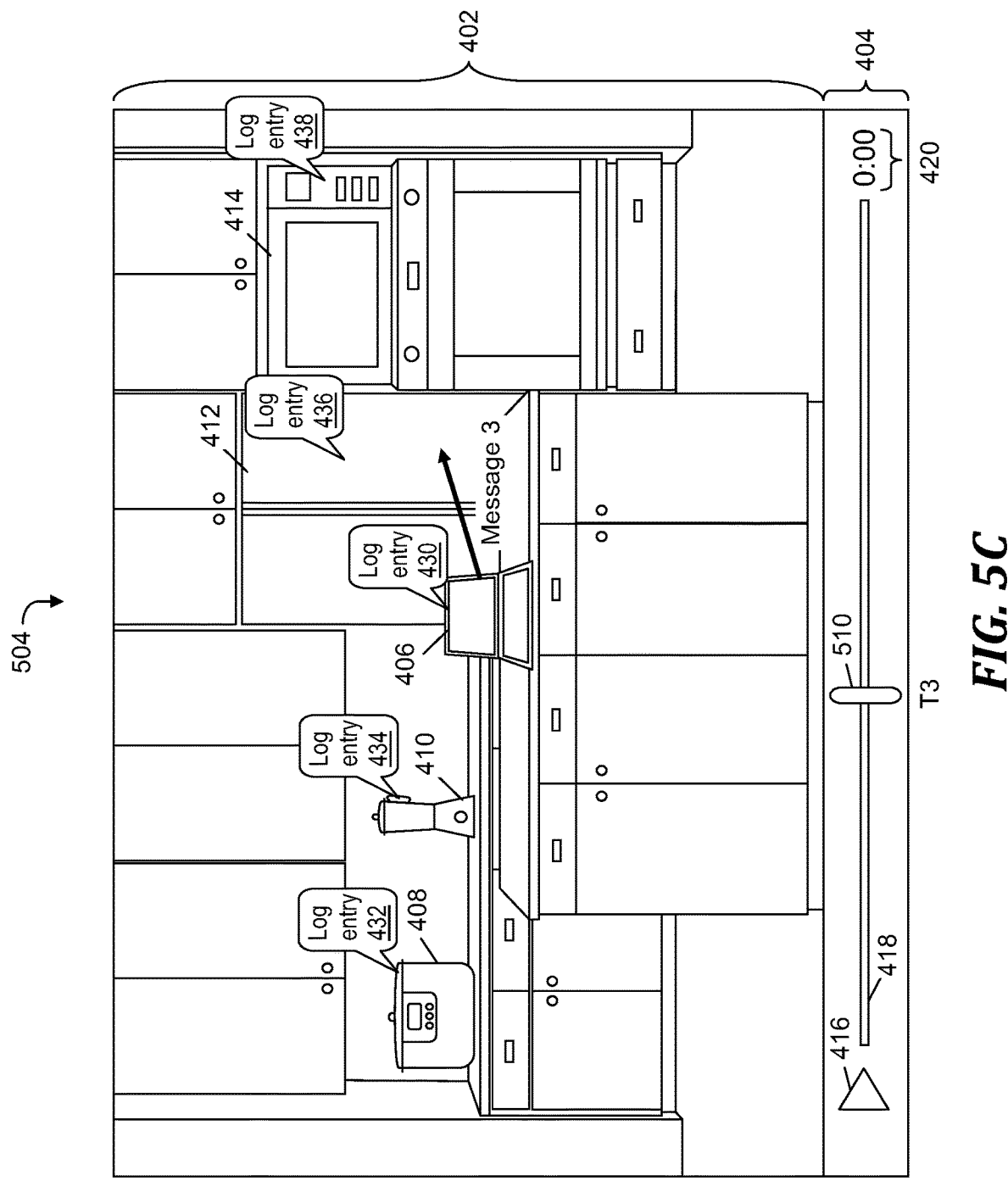

IoT device testing system 107 (see FIG. 1) overlays details of a third message (i.e., labeled "Message 3" in FIG. 5C) sent from IoT object 406 to IoT object 412 onto the video frame included in display area 402 in FIG. 5C. The third message is sent at a time T3, as indicated by a third position of timeline marker 510 on timeline 418.

Figure 5D:
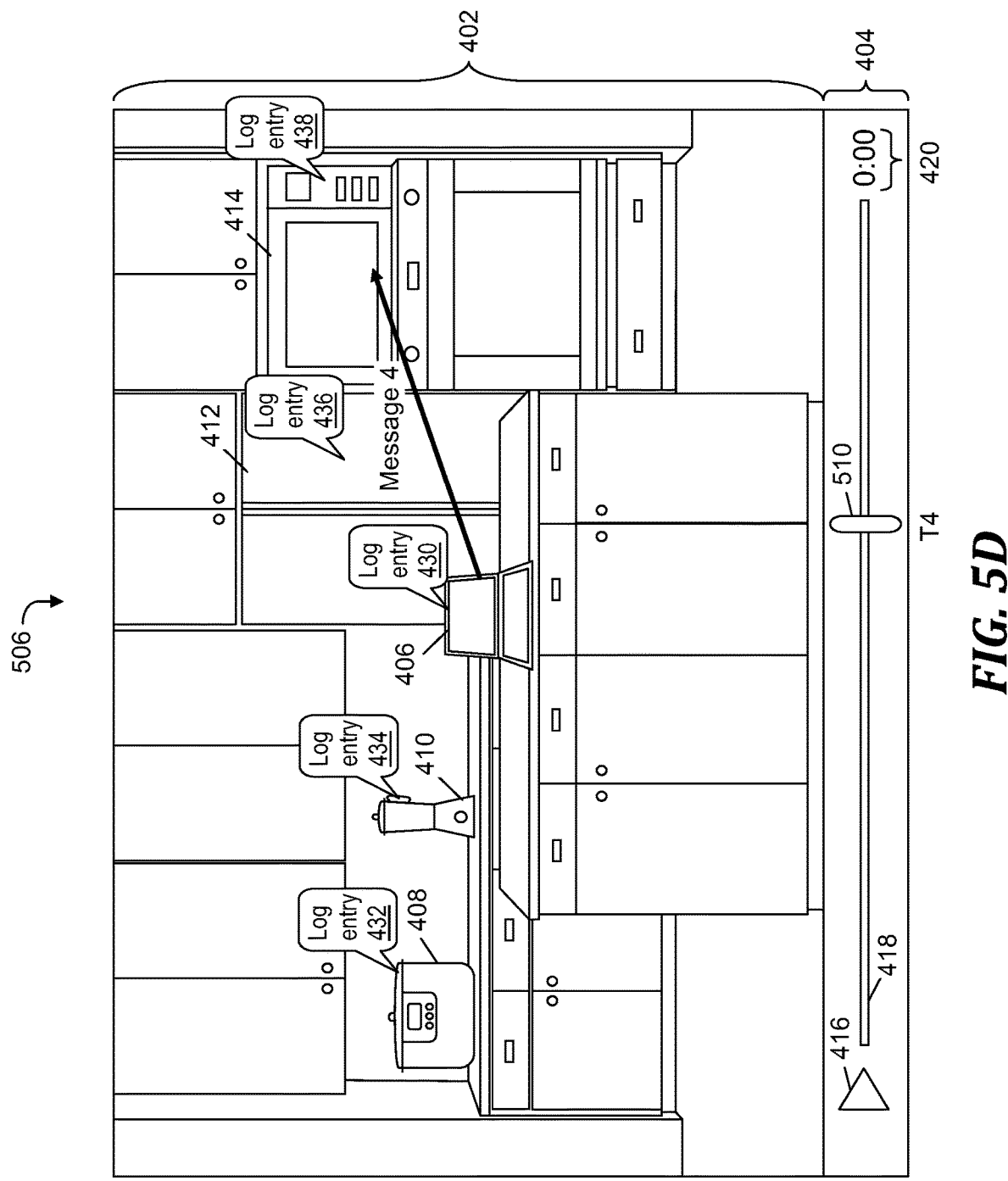

IoT device testing system 107 (see FIG. 1) overlays details of a fourth message (i.e., labeled "Message 4" in FIG. 5D) sent from IoT object 406 to IoT object 414 onto the video frame included in display area 402 in FIG. 5D. The second message is sent at a time T4, as indicated by a fourth position of timeline marker 510 on timeline 418.

FIG. 6 is an example of displaying log details that overlay components that are internal to an IoT device in the system of FIG. 1, in accordance with embodiments of the present invention. An end user uses a touchscreen gesture on a display of augmented video 118 (see FIG. 1) to zoom out from IoT device 406. The result of zooming out from IoT device 406 is IoT device testing system 107 (see FIG. 1) generating and displaying an augmented video 600-1, which depicts an architectural diagram of internal components (i.e., a diagram of components internal to IoT device 406) and interactions between the internal components. The interactions are illustrated in augmented video 600-1 by message details and other log details which overlay the internal components. Augmented video 600-1 includes a display area 602 and a control area 604. Display area 602 includes a set of internal components 606, a video timeline 608, and a timeline marker 610, which is in a position corresponding to time T5. IoT device testing system 107 (see FIG. 1) overlays message details 612 onto augmented video 600-1. Message details 612 describe a message sent from internal component 614 to internal component 616 at time T5.

In response to moving timeline marker 610 to time T6 (e.g., by an end user), IoT device testing system 107 (see FIG. 1) generates and displays augmented video 600-2, which includes display area 602, control area 604, set of internal components 606, and video timeline 608, as described above relative to augmented video 600-1. Timeline marker 610 in augmented video 600-2 is in a position indicating time T6. IoT device testing system 107 (see FIG. 1) overlays message details 618 onto augmented video 600-2. Message details 618 describe a message sent from internal component 618 to internal component 622 at time T6.

Although not depicted in FIG. 6, IoT device testing system 107 (see FIG. 1) may also overlay log details over components that are internal to an app, such as app 112-1 (see FIG. 1) or another app being executed by one of IoT devices 104-1, . . . , 104-N (see FIG. 1).

FIGS. 7A-7E depicts a sub-process of automatically detecting functional issues from a video stream, where the sub-process is included in the process of FIG. 2, in accordance with embodiments of the present invention. Detecting functional issues is included in step 214 (see FIG. 2). IoT device testing system 107 (see FIG. 1) detects and logs functional issues in response to one of the conditions described below:

(1) In IoT device testing, if a previous test step is successfully completed, then the target object would be available for the next test step to execute. If IoT device testing system 107 (see FIG. 1) is not able to find the target object, then the next test step in the IoT device testing is not able to execute and IoT device testing system 107 (see FIG. 1) identifies a functional issue regarding the inability to find the target object and test log beacons identifying the functional issue are automatically triggered. IoT device testing system 107 (see FIG. 1) overlays the details of the functional issue on augmented video 118 (see FIG. 1) using time correlation techniques.

(2) While a user interacts with one or more of IoT devices 104-1, . . . , 104-N (see FIG. 1), the user identifies one or more functional issues. The user makes predetermined gesture(s) while pointing at respective IoT device(s), each gesture corresponding to a particular functional issue. Using video processing techniques, IoT device testing system 107 (see FIG. 1) recognizes the gesture(s) made by the user. Based on the recognized gesture(s), IoT device testing system 107 (see FIG. 1) identifies the functional issue(s) indicated by the gesture(s) and overlays augmented video 118 (see FIG. 1) with details of the functional issue(s).

(3) IoT device testing system 107 (see FIG. 1) receives test logs that include errors and exceptions, identifies the errors and exceptions as functional issues, and overlays augmented video 118 (see FIG. 1) with details of the identified functional issues so that each IoT device that triggered a corresponding test log that had an error and/or exception is overlaid with the details of the corresponding functional issue.

Figure 7A:
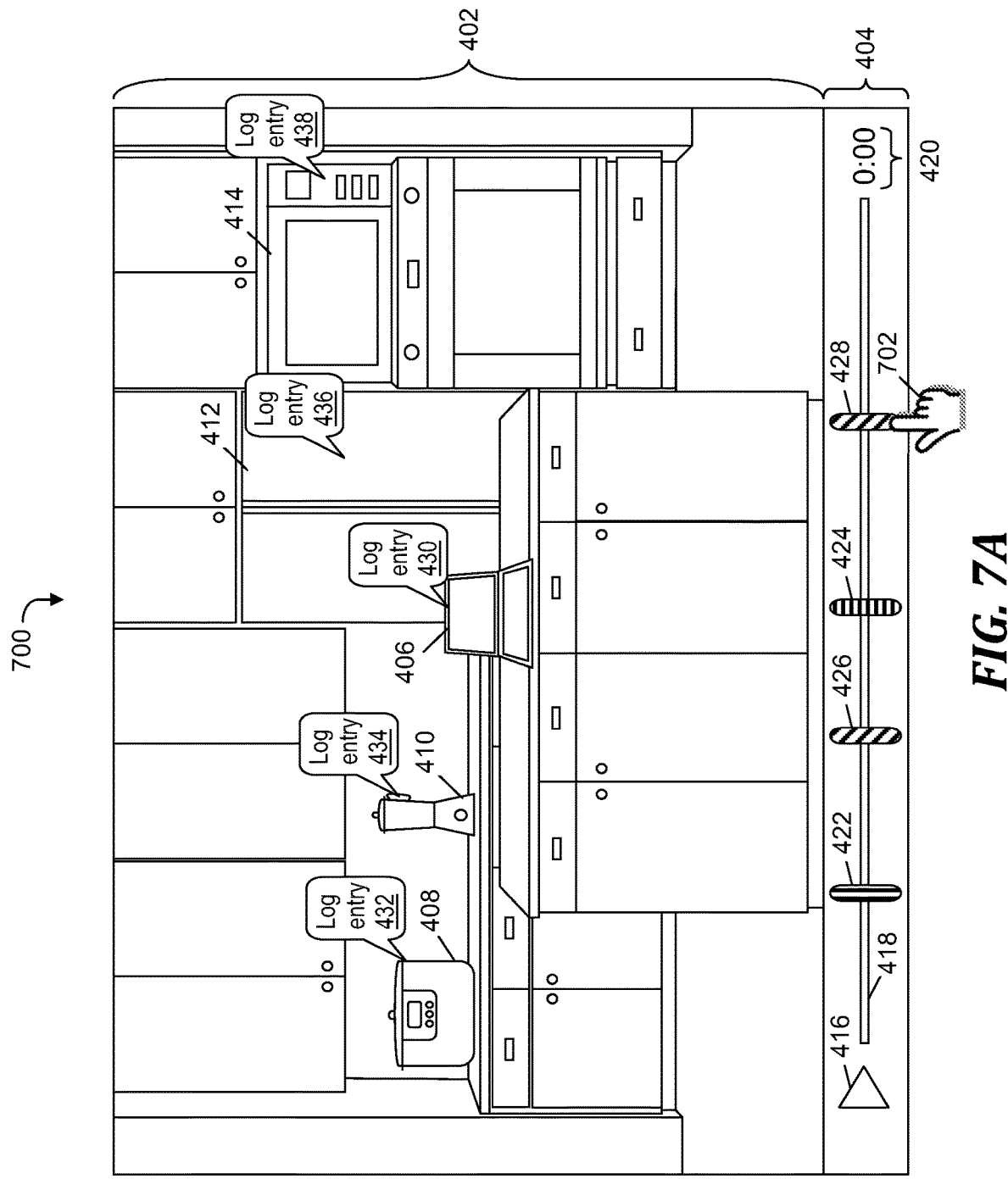
FIGS. 7A-7E depicts a sub-process of detecting functional issues from a video stream, where the sub-process is included in the process of FIG. 2, in accordance with embodiments of the present invention.
Figure 7B:
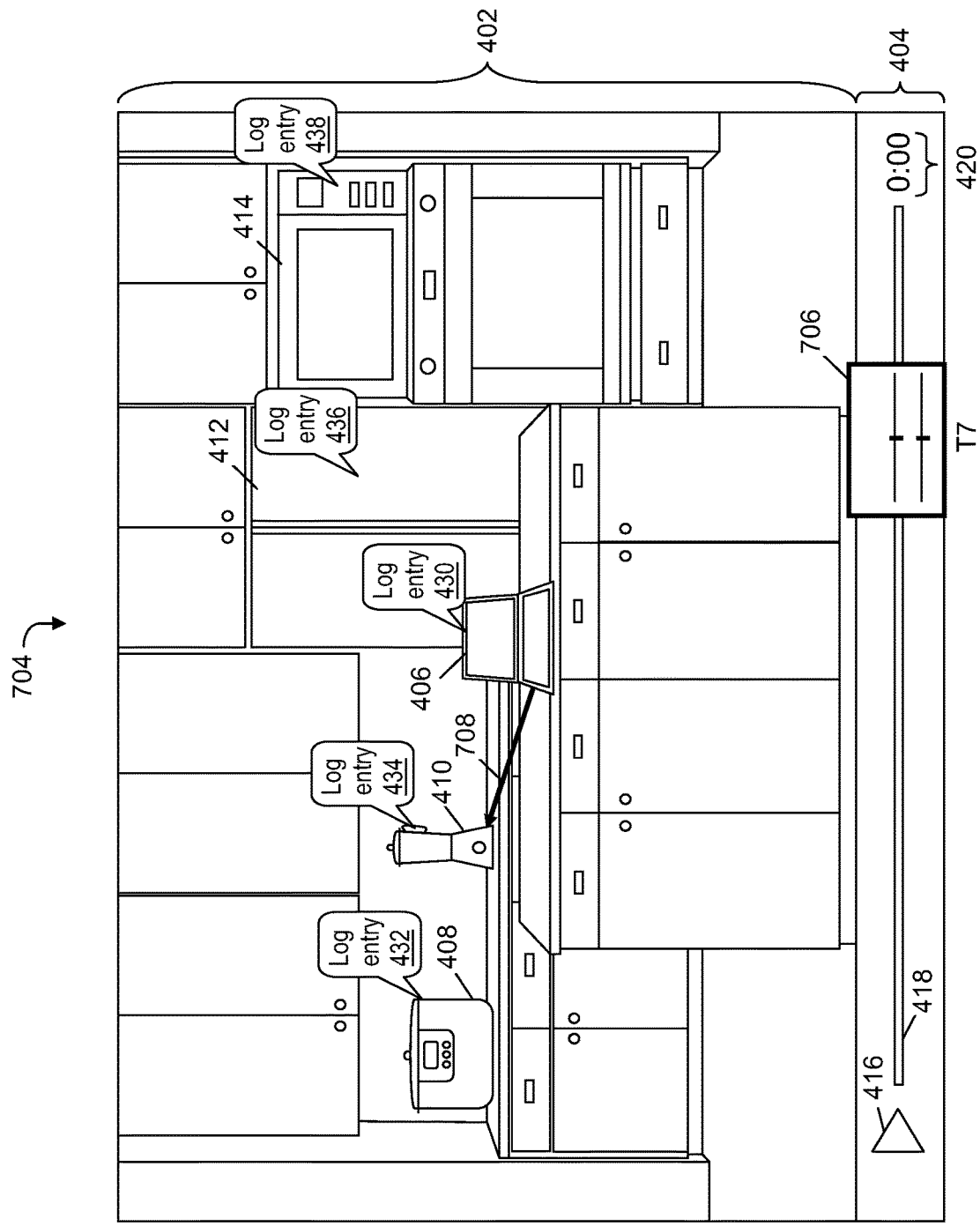

FIG. 7A depicts an augmented video 700 which is part of augmented video 118 (see FIG. 1). Augmented video 700 includes display area 402, control area 404, IoT devices 406, 408, 410, 412, and 414, video play button 416, video timeline 418, time indicator 420, timeline markers 422, 424, 426, and 428, and log entries 430, 432, 434, 436, and 438, which have functionalities as described above in the discussion of FIG. 4. Because a functional issue filter has been selected by a user, IoT device testing system 107 (see FIG. 1) automatically indexes augmented video 700 for events that cause functional issues, where the times of occurrence of the events are identified by the positions of timeline markers 422, 424, 426, and 428 on timeline 418.

A user performs an activation 702 of timeline marker 428 (e.g., the user touches timeline marker 428) to initiate a viewing of video 700 to trace past log entries related to an identification of a root cause of one of the functional issues. After activation 702 in FIG. 7A, IoT device testing system 107 (see FIG. 1) generates and displays augmented video 704 in FIG. 7B, which has the elements of augmented video 700 in FIG. 7A, but also includes a timeline marker control 706, which controls the timeline marker at a more highly granular level than the timeline markers in FIG. 7A. For example, timeline marker control 706 may place a timeline marker at a micro-second level to trace past log entries that lead to a root cause of the functional issue. Placing the timeline marker control 706 at time T7 in FIG. 7B causes IoT device testing system 107 (see FIG. 1) to overlay message details 708 in augmented video 704, where message details 708 describe a message sent from IoT device 406 to IoT device 410 at time T7, which indicates the functional issue being traced.

Figure 7C:
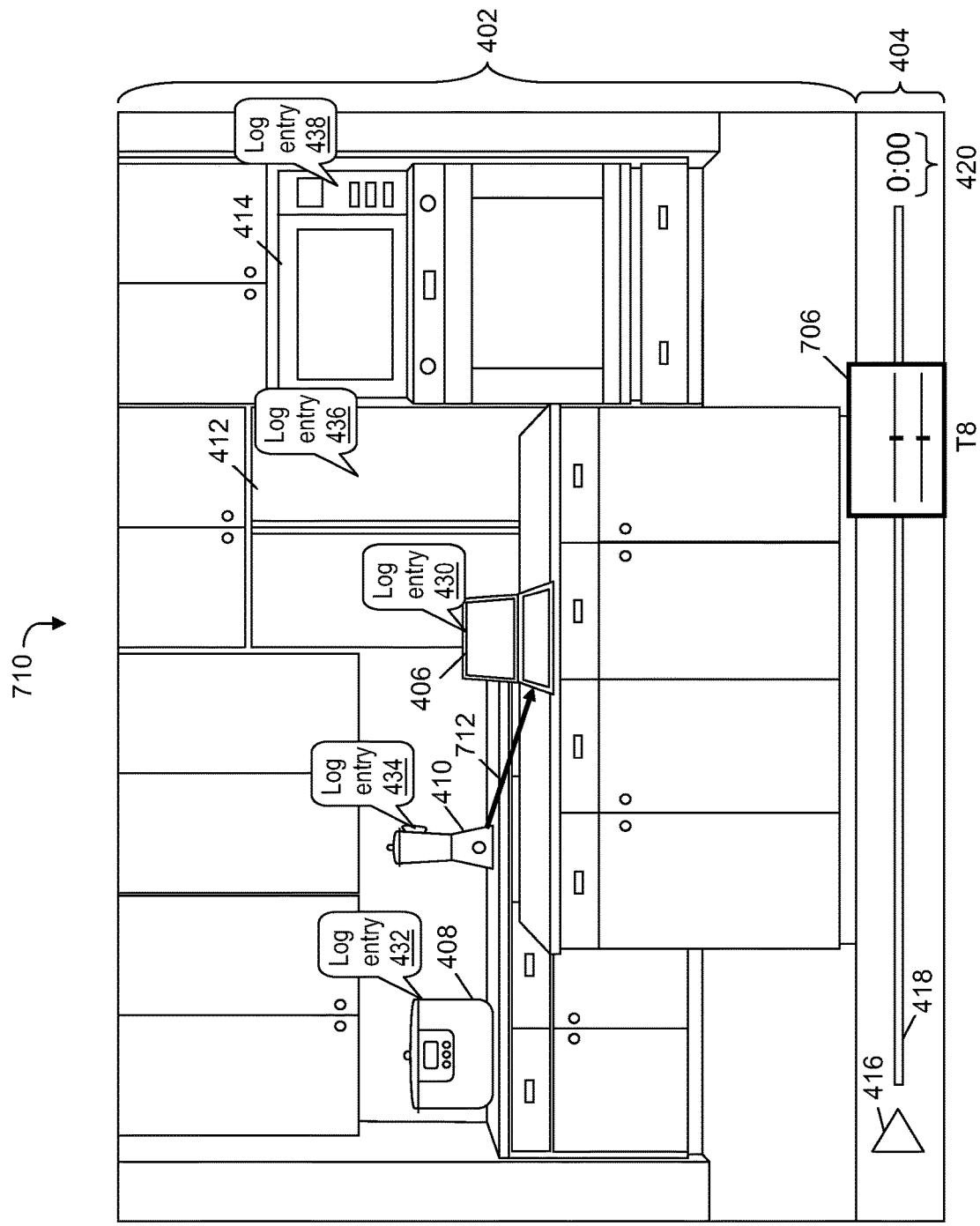

The user moves timeline marker control 706 to time T8 in FIG. 7C, which causes IoT device testing system 107 (see FIG. 1) to display augmented video 710 which includes an overlay of message details 712 describing a message sent from IoT device 410 to IoT device 406 at time T8. The user selects time T8 at the highly granular level (e.g., microsecond level) provided by control 706. By moving the timeline marker control 706 to time T8, the user is tracing back from the event associated with message 708 (see FIG. 7B) to another event related to the event associated with message 708 (see FIG. 7B), where the other event is associated with message 712. These related events indicate changes in the IoT devices that exchange the aforementioned messages, where the changes are indicated from data captured by video surveillance camera 102 (see FIG. 1), wearable sensor 114 (see FIG. 1), and/or sensor 116 (see FIG. 1) included in one of the IoT devices.

Figure 7D:
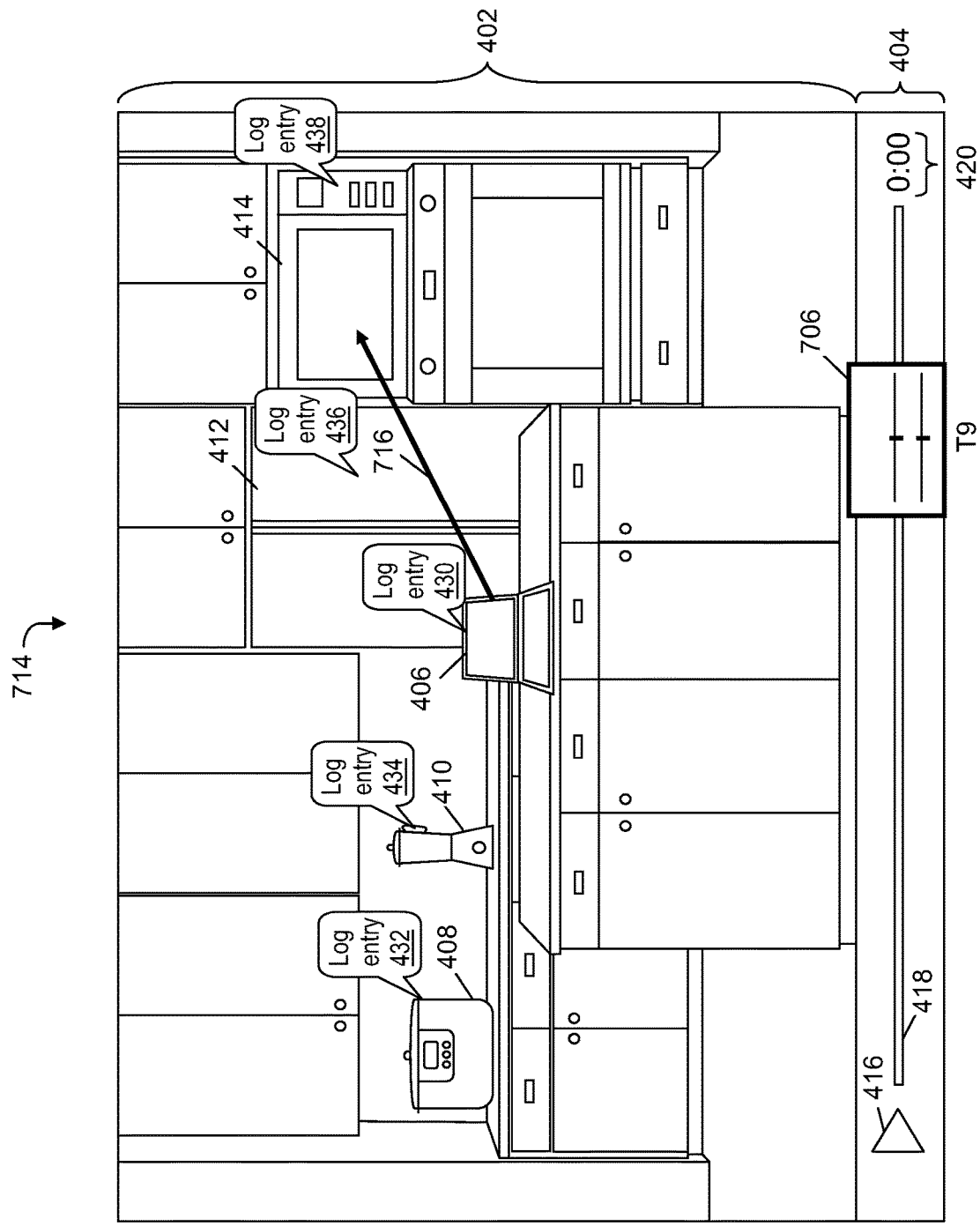

Because the user needs to trace back further to identify the root cause of the functional issue, the user moves the timeline marker control 706 from time T8 to time T9 (e.g., a previous time at the micro-second level) in FIG. 7D, which causes IoT device testing system 107 (see FIG. 1) to display augmented video 714 in FIG. 7D, which includes an overlay of message details 716 describing a message sent from IoT device 406 to IoT device 414 at time T9. By moving the timeline marker control 706 to time T9, the user is continuing to trace back the events that led to the functional issue, by tracing back from the event associated with message 712 (see FIG. 7C) to a previous event related to the event associated with message 712 (see FIG. 7C), where the previous event is associated with message 716.

Figure 7E:
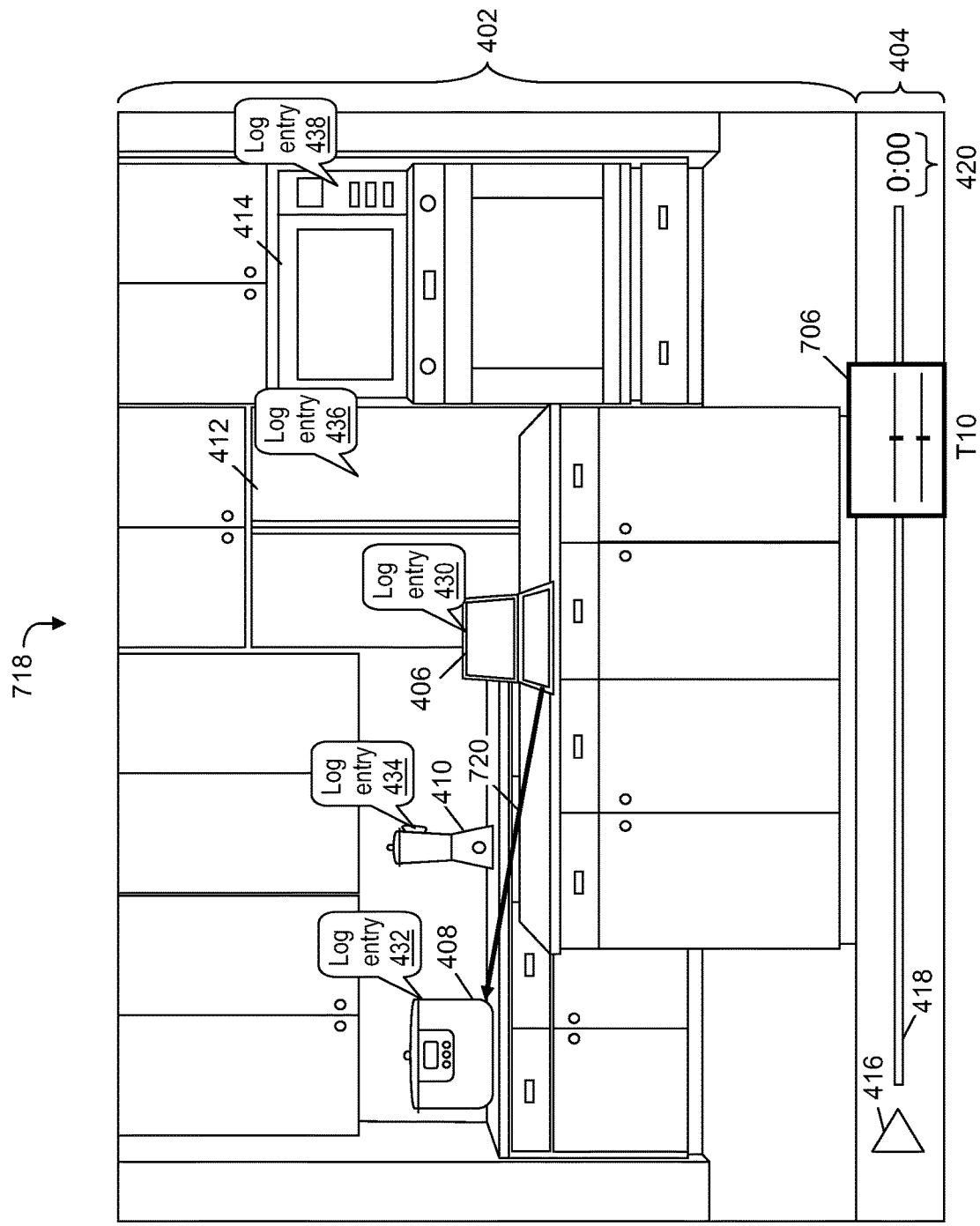

The user continues to trace back the events that led to the functional issue by moving the timeline marker control 706 from time T9 to time T10 (e.g., a previous time at the micro-second level) in FIG. 7E. Moving the control 706 to time T10 causes IoT device testing system 107 (see FIG. 1) to display augmented video 718 in FIG. 7E, which includes an overlay of message details 720 describing a message sent from IoT device 406 to IoT device 408 at time T10. By viewing message details 720, the user identifies the root cause of the functional issue.

The backtracking and identification of the root cause of the functional issue described above relative to FIGS. 7A-7E is an example of the backtracking and identification of a root cause in step 218 (see FIG. 2).

Figure 8:
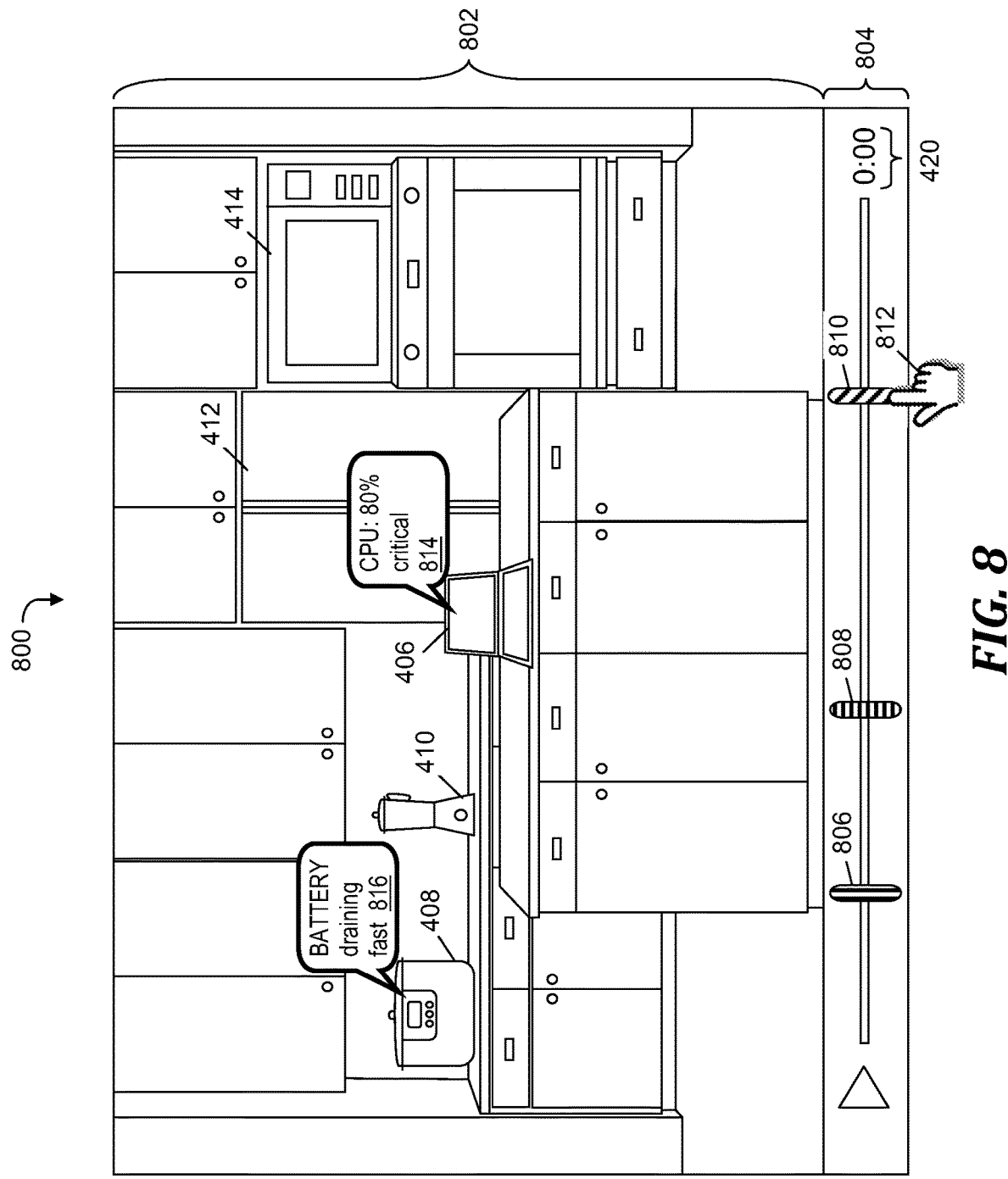
FIG. 8 depicts a sub-process of detecting performance issues from a video stream, where the sub-process is included in the process of FIG. 2, in accordance with embodiments of the present invention.

FIG. 8 depicts a sub-process of automatically detecting performance issues from a video stream, where the sub-process is included in the process of FIG. 2, in accordance with embodiments of the present invention. Detecting performance issues is included in step 214 (see FIG. 2). IoT device testing system 107 (see FIG. 1) detects and logs performance issues by: (1) receiving performance counters (e.g., CPU, memory, network, and battery performance counters) logged by corresponding IoT devices 104-1, . . . , 104-N (see FIG. 1) and apps being executed by IoT devices 104-1, . . . , 104-N (see FIG. 1); (2) associating the logged performance counters with the corresponding IoT devices and apps; (3) determining whether the performance counters exceed respective, predetermined thresholds; and (4) if a performance counter exceeds its threshold, then overlaying the performance issue onto augmented video 118 (see FIG. 1) in proximity to the corresponding IoT device or app.

FIG. 8 depicts an augmented video 800 which is part of augmented video 118 (see FIG. 1). Augmented video 800 includes a display area 802 and a control area 804. Display area 802 includes IoT devices 406, 408, 410, 412, and 414, and control area 804 includes time indicator 420 and timeline markers 806, 808, and 810. IoT devices 406, 408, 410, 412, and 414 and time indicator 420 have functionalities as described above in the discussion of FIG. 4. Because a performance issue filter has been selected by a user, IoT device testing system 107 (see FIG. 1) automatically indexes augmented video 800 for events that cause performance issues, where the times of occurrence of the events are identified by the positions of timeline markers 806, 808, and 810. Color coding of timeline markers 806, 808, and 810 indicate respective criticality levels (e.g., low, medium, and high criticality) of the corresponding performance issues at a time indicated by time indicator 420.

A user performs an activation 812 of timeline marker 810, which indicates a performance issue of high criticality, to initiate a viewing of video 800 to trace past log entries related to an identification of a root cause of the performance issue. In response to activation 812, IoT device testing system 107 (see FIG. 1) overlays augmented video 800 with text specifying performance issues which are at a high critical level. That is, augmented video 800 is overlaid with log details 814 in proximity to IoT device 406, which indicates the usage of CPU of IoT device 406 is at 80% of a critical level, and log details 816 in proximity to IoT device 408, which indicates the battery of IoT device 408 is draining fast.

Figure 9:
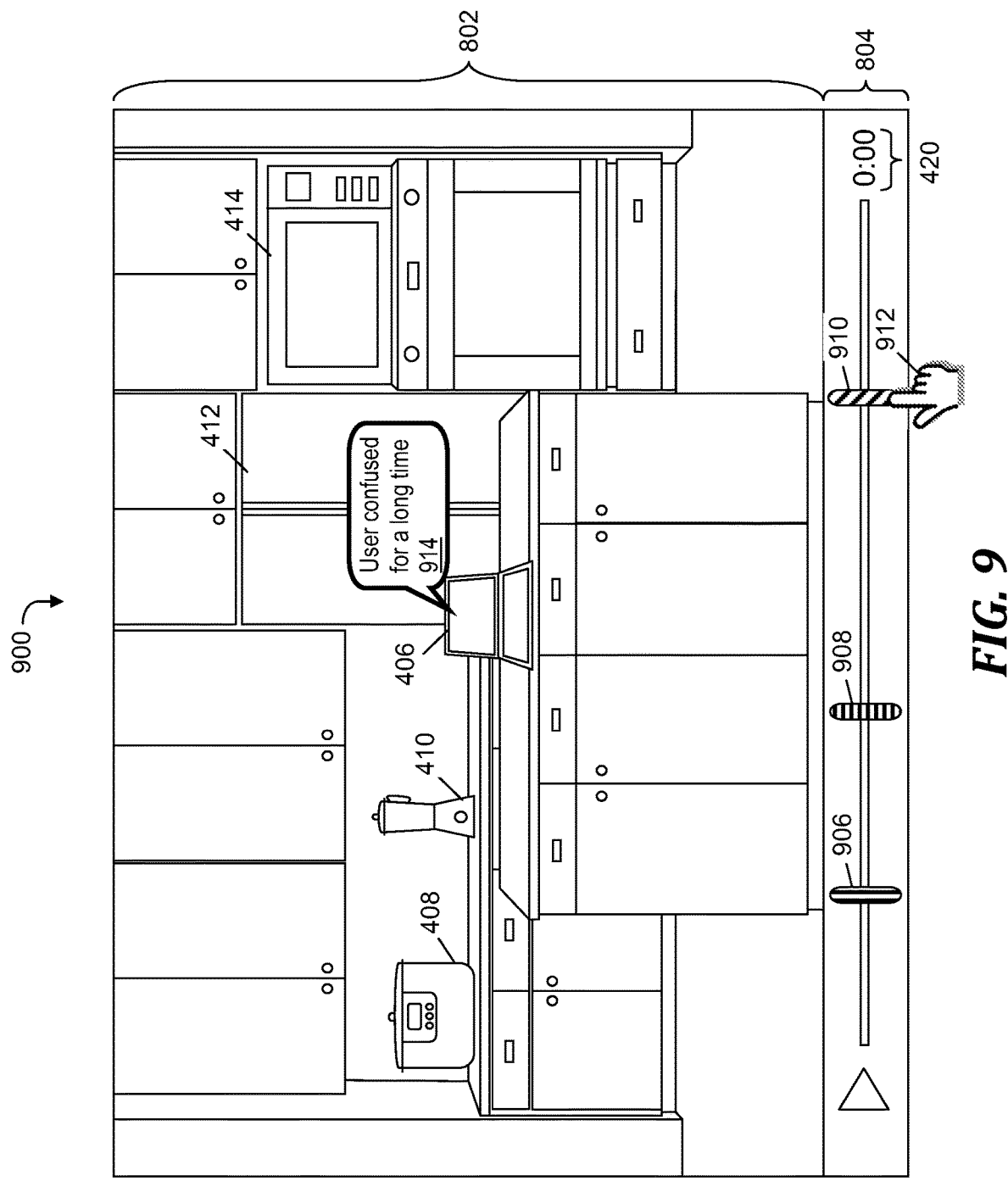
FIG. 9 depicts a sub-process of detecting a usability issue from a video stream, where the sub-process is included in the process of FIG. 2, in accordance with embodiments of the present invention.

FIG. 9 depicts a sub-process of automatically detecting usability issues from a video stream, where the sub-process is included in the process of FIG. 2, in accordance with embodiments of the present invention. Detecting usability issues is included in step 214 (see FIG. 2). IoT device testing system 107 (see FIG. 1) detects and logs usability issues by IoT device testing system 107 (see FIG. 1) (1) determining that the user is confused while interacting with one of IoT devices 104-1, . . . , 104-N (see FIG. 1) (e.g., by capturing and detecting facial expression(s) of the user in video streams, where the detected facial expression(s) match predetermined expression(s) that indicate confusion); or (2) determining that a user is delaying an initiation or a completion of an interaction with one of IoT devices 104-1, . . . , 104-N (see FIG. 1) (e.g., determining that the user has taken an excessive amount of time to complete an input into an IoT device while gazing continuously at the IoT device, where the amount of time is excessive because the amount of time exceeds a predetermined threshold amount of time, thereby indicating that the user is confused.

FIG. 9 depicts an augmented video 900 which is part of augmented video 118 (see FIG. 1). Augmented video 900 includes a display area 802 and a control area 804. Display area 802 includes IoT devices 406, 408, 410, 412, and 414 and control area 804 includes time indicator 420 and timeline markers 906, 908, and 910. IoT devices 406, 408, 410, 412, and 414, and time indicator 420 have functionalities as described above in the discussion of FIG. 4. Because a usability issue filter has been selected by a user, IoT device testing system 107 (see FIG. 1) automatically indexes augmented video 900 for events that cause usability issues, where the times of occurrence of the events are identified by the positions of timeline markers 906, 908, and 910. Color coding of timeline markers 906, 908, and 910 indicate respective criticality levels (e.g., low, medium, and high criticality) of the corresponding usability issues at a time indicated by time indicator 420.

A user performs an activation 912 of timeline marker 910, which indicates a usability issue of high criticality, to initiate a viewing of video 900 to trace past log entries related to an identification of a root cause of the usability issue. In response to activation 912, IoT device testing system 107 (see FIG. 1) overlays augmented video 900 with text (e.g., "User confused for a long time" in FIG. 9) specifying a usability issue which is at a high critical level. That is, augmented video 900 is overlaid with log details 914 in proximity to IoT device 406, which indicates that the user was in a confused state when interacting with IoT device 406 at the time indicated by the position of timeline marker 910.

Computer System

Figure 10:
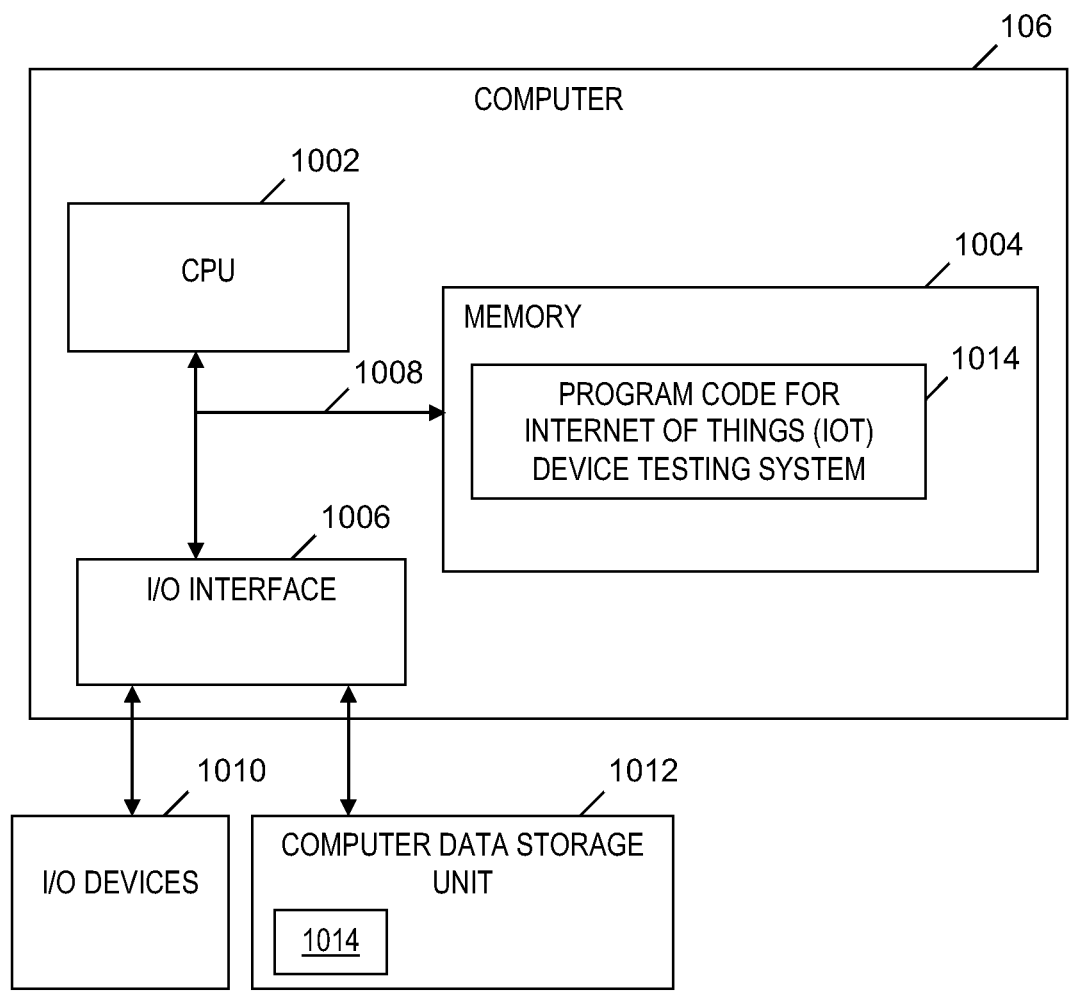
FIG. 10 is a block diagram of a computer that is included in the system of FIG. 1 and that implements the process of FIG. 2, in accordance with embodiments of the present invention.

FIG. 10 is a block diagram of a computer that is included in the system of FIG. 1 and that implements the process of FIG. 2, in accordance with embodiments of the present invention. Computer 106 is a computer system that generally includes a central processing unit (CPU) 1002, a memory 1004, an input/output (I/O) interface 1006, and a bus 1008. Further, computer 106 is coupled to I/O devices 1010 and a computer data storage unit 1012. CPU 1002 performs computation and control functions of computer 106, including executing instructions included in program code 1014 for IoT device testing system 107 (see FIG. 1) to perform a method of testing IoT devices by using augmented video analytics, where the instructions are executed by CPU 1002 via memory 1004. CPU 1002 may include a single processing unit, or be distributed across one or more processing units in one or more locations (e.g., on a client and server).

Memory 1004 includes a known computer readable storage medium, which is described below. In one embodiment, cache memory elements of memory 1004 provide temporary storage of at least some program code (e.g., program code 1014) in order to reduce the number of times code must be retrieved from bulk storage while instructions of the program code are executed. Moreover, similar to CPU 1002, memory 1004 may reside at a single physical location, including one or more types of data storage, or be distributed across a plurality of physical systems in various forms. Further, memory 1004 can include data distributed across, for example, a local area network (LAN) or a wide area network (WAN).

I/O interface 1006 includes any system for exchanging information to or from an external source. I/O devices 1010 include any known type of external device, including a display device, keyboard, etc. Bus 1008 provides a communication link between each of the components in computer 106, and may include any type of transmission link, including electrical, optical, wireless, etc.

I/O interface 1006 also allows computer 106 to store information (e.g., data or program instructions such as program code 1014) on and retrieve the information from computer data storage unit 1012 or another computer data storage unit (not shown). Computer data storage unit 1012 includes a known computer-readable storage medium, which is described below. In one embodiment, computer data storage unit 1012 is a non-volatile data storage device, such as a magnetic disk drive (i.e., hard disk drive) or an optical disc drive (e.g., a CD-ROM drive which receives a CD-ROM disk).

Memory 1004 and/or storage unit 1012 may store computer program code 1014 that includes instructions that are executed by CPU 1002 via memory 1004 to test IoT devices by using augmented video analytics. Although FIG. 10 depicts memory 1004 as including program code, the present invention contemplates embodiments in which memory 1004 does not include all of code 1014 simultaneously, but instead at one time includes only a portion of code 1014.

Further, memory 1004 may include an operating system (not shown) and may include other systems not shown in FIG. 10.

Storage unit 1012 and/or one or more other computer data storage units (not shown) that are coupled to computer 106 may store any combination of: augmented video 118 (see FIG. 1) and index 120 (see FIG. 1). In one embodiment, storage unit 1012 includes data repository 105 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to testing IoT devices by using augmented video analytics. Thus, an embodiment of the present invention discloses a process for supporting computer infrastructure, where the process includes providing at least one support service for at least one of integrating, hosting, maintaining and deploying computer-readable code (e.g., program code 1014) in a computer system (e.g., computer 106) including one or more processors (e.g., CPU 1002), wherein the processor(s) carry out instructions contained in the code causing the computer system to test IoT devices by using augmented video analytics. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of testing IoT devices by using augmented video analytics.

While it is understood that program code 1014 for testing IoT devices by using augmented video analytics may be deployed by manually loading directly in client, server and proxy computers (not shown) via loading a computer-readable storage medium (e.g., computer data storage unit 1012), program code 1014 may also be automatically or semi-automatically deployed into computer 106 by sending program code 1014 to a central server or a group of central servers. Program code 1014 is then downloaded into client computers (e.g., computer 106) that will execute program code 1014. Alternatively, program code 1014 is sent directly to the client computer via e-mail. Program code 1014 is then either detached to a directory on the client computer or loaded into a directory on the client computer by a button on the e-mail that executes a program that detaches program code 1014 into a directory. Another alternative is to send program code 1014 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 1014 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of testing IoT devices by using augmented video analytics. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 1004 and computer data storage unit 1012) having computer readable program instructions 1014 thereon for causing a processor (e.g., CPU 1002) to carry out aspects of the present invention.

The computer readable storage medium can be a tangible device that can retain and store instructions (e.g., program code 1014) for use by an instruction execution device (e.g., computer 106). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 1014) described herein can be downloaded to respective computing/processing devices (e.g., computer 106) from a computer readable storage medium or to an external computer or external storage device (e.g., computer data storage unit 1012) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 1014) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 10) and/or block diagrams (e.g., FIG. 1 and FIG. 10) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 1014).

These computer readable program instructions may be provided to a processor (e.g., CPU 1002) of a general purpose computer, special purpose computer, or other programmable data processing apparatus (e.g., computer 106) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 1012) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 1014) may also be loaded onto a computer (e.g. computer 106), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of testing a device in an Internet of Things, the method comprising the steps of:
   a computer receiving first data items indicating visually perceptible physical output of the device during a testing of the device, the first data items being (i) indications of interactions of one or more humans with the device that occur during the testing and (ii) captured on a video by a video camera surveilling the device during the testing, and the video camera being coupled to the computer;
   the computer receiving second data items indicating non-visually perceptible physical output of the device during the testing;
   the computer receiving an event log from a beacon continuously streamed by the device, the event log generated by an instrumented application being executed in the device;
   based on the first data items indicating visually perceptible physical output, the second data items indicating non-visually perceptible physical output, the event log, and the indications of the interactions, the computer overlaying the first data items, the second data items, entries included in the event log, and the indications of the interactions onto respective frames of the video that include the device, so that timings of the frames are correlated with timestamps of (1) the first data items, (2) the second data items, (3) the entries from the event log, and (4) the indications of the interactions;
   based on the video having the overlaid first data items, second data items, entries included in the event log, and the indications of the interactions, the computer detecting performance, functionality, and usability issues and generating respective markers of the issues;
   the computer indexing the video with the markers by overlaying the markers on a timeline of the video; and
   in response to a selection of one of the markers by a user which indicates an issue included in the issues, the computer locating and displaying a frame of the video that depicts the issue.

2. The method of claim 1, further comprising the steps of based on the selection of one of the markers, the computer backtracking from an occurrence of the issue in the video through the first data items, the second data items, the event log, and the indications of the interactions, and in response to the backtracking, identifying a root cause of the issue.

3. The method of claim 1, further comprising the steps of:
   the computer receiving device-level performance counters logged by the device, the performance counters indicating a performance of a central processing unit, memory, and battery of the device and a performance of a network to which the device is connected;
   the computer overlaying the performance counters on the frames of the video that include the device;
   the computer determining a performance counter included in the performance counters exceeds a threshold value; and
   based on the performance counter exceeding the threshold value, the computer detecting one of the performance issues with the device and marking the detected performance issue in the video.

4. The method of claim 1, further comprising the steps of:
the computer determining that the device as a target object is not found, which results in the target object not being able to execute a next test step after a previous test step is successfully executed;
the computer receiving a test log beacon from the device, the test log beacon being automatically triggered by the device in response to the next test step not being able to be executed;
the computer retrieving a test log included in the test log beacon;
the computer overlaying the test log on the device depicted in the video based on the test log being included in the test log beacon which was triggered by the device; and
based on the target object not being found and the target object not being able to execute the next step, the computer detecting one of the functional issues with device and marking the detected functional issue in the video.

5. The method of claim 1, further comprising the steps of:
the computer detecting a gesture in proximity to the device, the gesture indicating a functional issue with the device;
the computer determining that a human tester of the device is making the gesture;
the computer receiving a test log beacon from the device;
the computer retrieving a test log included in the test log beacon;
the computer overlaying the test log on the device depicted in the video; and
based on the gesture having been detected and the human tester of the device having made the gesture, the computer detecting one of the functional issues and marking the detected functional issue in the video.

6. The method of claim 1, further comprising the steps of:
the computer detecting a state of confusion of a human tester of the device by (1) identifying a facial expression of the human tester which indicates the confusion of the human tester or (2) detecting a delay in an input by the human tester into the device and determining that the delay occurs while a gaze of the human tester is directed toward the device; and
based on the detected state of confusion, the computer detecting one of the usability issues and marking the detected usability issue in the video.

7. The method of claim 1, further comprising the step of:
providing at least one support service for at least one of creating, integrating, hosting, maintaining, and deploying computer-readable program code in the computer, the program code being executed by a processor of the computer to implement the steps of receiving the first data items, receiving the second data items, receiving the event log, overlaying the first data items, the second data items, the entries included in the event log, and the indications of the interactions onto the respective frames of the video that include the device, detecting the performance, functionality, and usability issues, generating the respective markers of the issues, indexing the video, and locating and displaying the frame of the video that depicts the issue.

8. A computer program product, comprising:
a computer-readable storage device; and
a computer-readable program code stored in the computer-readable storage device, the computer-readable program code containing instructions that are executed by a central processing unit (CPU) of a computer system to implement a method of testing a device in an Internet of Things, the method comprising the steps of:
the computer system receiving first data items indicating visually perceptible physical output of the device during a testing of the device, the first data items being (i) indications of interactions of one or more humans with the device that occur during the testing and (ii) captured on a video by a video camera surveilling the device during the testing, and the video camera being coupled to the computer system;
the computer system receiving second data items indicating non-visually perceptible physical output of the device during the testing;
the computer system receiving an event log from a beacon continuously streamed by the device, the event log generated by an instrumented application being executed in the device;
based on the first data items indicating visually perceptible physical output, the second data items indicating non-visually perceptible physical output, the event log, and the indications of the interactions, the computer system overlaying the first data items, the second data items, entries included in the event log, and the indications of the interactions onto respective frames of the video that include the device, so that timings of the frames are correlated with timestamps of (1) the first data items, (2) the second data items, (3) the entries from the event log, and (4) the indications of the interactions;
based on the video having the overlaid first data items, second data items, entries included in the event log, and the indications of the interactions, the computer system detecting performance, functionality, and usability issues and generating respective markers of the issues;
the computer system indexing the video with the markers by overlaying the markers on a timeline of the video; and
in response to a selection of one of the markers by a user which indicates an issue included in the issues, the computer system locating and displaying a frame of the video that depicts this issue.

9. The computer program product of claim 8, wherein the method further comprises the steps of based on the selection of one of the markers, the computer system backtracking from an occurrence of the issue in the video through the first data items, the second data items, the event log, and the indications of the interactions, and in response to the backtracking, identifying a root cause of the issue.

10. The computer program product of claim 8, wherein the method further comprises the steps of:
the computer system receiving device-level performance counters logged by the device, the performance counters indicating a performance of a central processing unit, memory, and battery of the device and a performance of a network to which the device is connected;
the computer system overlaying the performance counters on the frames of the video that include the device;
the computer system determining a performance counter included in the performance counters exceeds a threshold value; and
based on the performance counter exceeding the threshold value, the computer system detecting one of the performance issues with the device and marking the detected performance issue in the video.

11. The computer program product of claim 8, wherein the method further comprises the steps of:
   the computer system determining that the device as a target object is not found, which results in the target object not being able to execute a next test step after a previous test step is successfully executed;
   the computer system receiving a test log beacon from the device, the test log beacon being automatically triggered by the device in response to the next test step not being able to be executed;
   the computer system retrieving a test log included in the test log beacon;
   the computer system overlaying the test log on the device depicted in the video based on the test log being included in the test log beacon which was triggered by the device; and
   based on the target object not being found and the target object not being able to execute the next step, the computer system detecting one of the functional issues with device and marking the detected functional issue in the video.

12. The computer program product of claim 8, wherein the method further comprises the steps of:
   the computer system detecting a gesture in proximity to the device, the gesture indicating a functional issue with the device;
   the computer system determining that a human tester of the device is making the gesture;
   the computer system receiving a test log beacon from the device;
   the computer system retrieving a test log included in the test log beacon;
   the computer system overlaying the test log on the device depicted in the video; and
   based on the gesture having been detected and the human tester of the device having made the gesture, the computer system detecting one of the functional issues and marking the detected functional issue in the video.

13. The computer program product of claim 8, wherein the method further comprises the steps of:
   the computer system detecting a state of confusion of a human tester of the device by (1) identifying a facial expression of the human tester which indicates the confusion of the human tester or (2) detecting a delay in an input by the human tester into the device and determining that the delay occurs while a gaze of the human tester is directed toward the device; and
   based on the detected state of confusion, the computer system detecting one of the usability issues and marking the detected usability issue in the video.

14. A computer system comprising:
   a central processing unit (CPU);
   a memory coupled to the CPU; and
   a computer readable storage device coupled to the CPU, the storage device containing instructions that are executed by the CPU via the memory to implement a method of testing a device in an Internet of Things, the method comprising the steps of:
      the computer system receiving first data items indicating visually perceptible physical output of the device during a testing of the device, the first data items being (i) indications of interactions of one or more humans with the device that occur during the testing and (ii) captured on a video by a video camera surveilling the device during the testing, and the video camera being coupled to the computer system;
      the computer system receiving second data items indicating non-visually perceptible physical output of the device during the testing;
      the computer system receiving an event log from a beacon continuously streamed by the device, the event log generated by an instrumented application being executed in the device;
      based on the first data items indicating visually perceptible physical output, the second data items indicating non-visually perceptible physical output, the event log, and the indications of the interactions, the computer system overlaying the first data items, the second data items, entries included in the event log, and the indications of the interactions onto respective frames of the video that include the device, so that timings of the frames are correlated with timestamps of (1) the first data items, (2) the second data items, (3) the entries from the event log, and (4) the indications of the interactions;
      based on the video having the overlaid first data items, second data items, entries included in the event log, and the indications of the interactions, the computer system detecting performance, functionality, and usability issues and generating respective markers of the issues;
      the computer system indexing the video with the markers by overlaying the markers on a timeline of the video; and
      in response to a selection of one of the markers by a user which indicates an issue included in the issues, the computer system locating and displaying a frame of the video that depicts the issue.

15. The computer system of claim 14, wherein the method further comprises the steps of based on the selection of one of the markers, the computer system backtracking from an occurrence of the issue in the video through the first data items, the second data items, the event log, and the indications of the interactions, and in response to the backtracking, identifying a root cause of the issue.

16. The computer system of claim 14, wherein the method further comprises the steps of:
   the computer system receiving device-level performance counters logged by the device, the performance counters indicating a performance of a central processing unit, memory, and battery of the device and a performance of a network to which the device is connected;
   the computer system overlaying the performance counters on the frames of the video that include the device;
   the computer system determining a performance counter included in the performance counters exceeds a threshold value; and
   based on the performance counter exceeding the threshold value, the computer system detecting one of the performance issues with the device and marking the detected performance issue in the video.

17. The computer system of claim 14, wherein the method further comprises the steps of:
   the computer system determining that the device as a target object is not found, which results in the target object not being able to execute a next test step after a previous test step is successfully executed;
   the computer system receiving a test log beacon from the device, the test log beacon being automatically triggered by the device in response to the next test step not being able to be executed;
   the computer system retrieving a test log included in the test log beacon;

the computer system overlaying the test log on the device depicted in the video based on the test log being included in the test log beacon which was triggered by the device; and based on the target object not being found and the target object not being able to execute the next step, the computer system detecting one of the functional issues with device and marking the detected functional issue in the video.

18. The computer system of claim 14, wherein the method further comprises the steps of:

the computer system detecting a gesture in proximity to the device, the gesture indicating a functional issue with the device;

the computer system determining that a human tester of the device is making the gesture;

the computer system receiving a test log beacon from the device;

the computer system retrieving a test log included in the test log beacon;

the computer system overlaying the test log on the device depicted in the video; and based on the gesture having been detected and the human tester of the device having made the gesture, the computer system detecting one of the functional issues and marking the detected functional issue in the video.

19. The computer system of claim 14, wherein the method further comprises the steps of:

the computer system detecting a state of confusion of a human tester of the device by (1) identifying a facial expression of the human tester which indicates the confusion of the human tester or (2) detecting a delay in an input by the human tester into the device and determining that the delay occurs while a gaze of the human tester is directed toward the device; and based on the detected state of confusion, the computer system detecting one of the usability issues and marking the detected usability issue in the video.

* * * * *